(12) United States Patent
Wilson-Thomas et al.

(10) Patent No.: US 11,900,080 B2
(45) Date of Patent: Feb. 13, 2024

(54) SOFTWARE DEVELOPMENT AUTOCREATED SUGGESTION PROVENANCE

(71) Applicant: Microsoft Technology Licensing, LLC, Redmond, WA (US)

(72) Inventors: Mark Alistair Wilson-Thomas, Mercer Island, WA (US); German David Obando Chacon, Kirkland, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 16/924,316

(22) Filed: Jul. 9, 2020

(65) Prior Publication Data

US 2022/0012019 A1 Jan. 13, 2022

(51) Int. Cl.
*G06F 8/33* (2018.01)
*G06F 8/70* (2018.01)

(52) U.S. Cl.
CPC . *G06F 8/33* (2013.01); *G06F 8/70* (2013.01)

(58) Field of Classification Search
None
See application file for complete search history.

(56) References Cited

U.S. PATENT DOCUMENTS

| 8,566,789 | B2 | 10/2013 | Siddaramappa et al. |
| 2005/0166193 | A1 | 7/2005 | Smith et al. |
| 2007/0299793 | A1 | 12/2007 | Musuvathi et al. |
| 2008/0172650 | A1 | 7/2008 | Gulwani et al. |
| 2008/0276025 | A1 | 11/2008 | Cherem et al. |
| 2008/0282108 | A1 | 11/2008 | Jojic et al. |
| 2008/0301655 | A1 | 12/2008 | Gulwani et al. |

(Continued)

OTHER PUBLICATIONS

David Ramel, "Microsoft Boosts AI-Assisted Developer Productivity", retrieved from <<https://visualstudiomagazine.com/articles/2019/11/05/ai-tooling.aspx>>, Nov. 5, 2019, 7 pages.

(Continued)

*Primary Examiner* — Qing Chen
(74) *Attorney, Agent, or Firm* — Ogilvie Law Firm

(57) ABSTRACT

Some embodiments determine automatically which synthesized or otherwise autocreated suggestions for source code editing are presented to developers. Some filter out autocreated coding suggestions that have not been sufficiently endorsed by a developer's team, based on a suggestion trust score. The trust score may reflect the suggestion's adoption in a particular repository or codebase, or affiliation of the suggestion with a library release, or an actual or implied review of the suggestion by team members. Some suggestion filters enhance existing development team code review practices, by offering endorsed suggestions in autocompletion or analysis interfaces of tools and by withholding non-endorsed suggestions from display. Context illustrating the autocreated suggestion's provenance may be displayed to help developers decide whether to adopt the suggestion themselves while editing code. Some tools that are enhanced with suggestion filtering functionality avoid developer configuration burdens while increasing consistent adoption of endorsed suggestions inside a codebase.

20 Claims, 4 Drawing Sheets

(56) References Cited

U.S. PATENT DOCUMENTS

| | | | |
|---|---|---|---|
| 2009/0024552 A1* | 1/2009 | Klein | G06N 5/025 706/47 |
| 2009/0276763 A1 | 11/2009 | Gulwani et al. | |
| 2009/0326907 A1 | 12/2009 | Gulwani et al. | |
| 2009/0327997 A1 | 12/2009 | Gulwani et al. | |
| 2010/0088548 A1 | 4/2010 | Gulwani et al. | |
| 2010/0088684 A1 | 4/2010 | Gulwani et al. | |
| 2010/0318980 A1 | 12/2010 | Gulwani et al. | |
| 2011/0078665 A1 | 3/2011 | Gulwani et al. | |
| 2011/0225572 A1 | 9/2011 | Stoicescu et al. | |
| 2011/0252394 A1* | 10/2011 | Sharma | G06F 11/3616 717/101 |
| 2011/0302553 A1 | 12/2011 | Gulwani et al. | |
| 2012/0011084 A1 | 1/2012 | Gulwani et al. | |
| 2012/0011152 A1 | 1/2012 | Gulwani et al. | |
| 2012/0192051 A1 | 7/2012 | Rothschiller et al. | |
| 2012/0197829 A1 | 8/2012 | Nori et al. | |
| 2012/0198322 A1 | 8/2012 | Gulwani et al. | |
| 2013/0144902 A1 | 6/2013 | Gulwani et al. | |
| 2013/0188877 A1 | 7/2013 | Gulwani et al. | |
| 2013/0263086 A1* | 10/2013 | Carter | G06F 8/33 717/113 |
| 2013/0275847 A1 | 10/2013 | Gulwani et al. | |
| 2013/0326475 A1 | 12/2013 | Gulwani et al. | |
| 2013/0346982 A1 | 12/2013 | Kalai et al. | |
| 2014/0013299 A1 | 1/2014 | Bordeaux et al. | |
| 2014/0059078 A1 | 2/2014 | Gulwani et al. | |
| 2014/0108305 A1 | 4/2014 | Gulwani et al. | |
| 2014/0173563 A1* | 6/2014 | Dias | G06F 8/36 717/123 |
| 2014/0214399 A1 | 7/2014 | Gulwani et al. | |
| 2014/0236991 A1 | 8/2014 | Gulwani et al. | |
| 2014/0282375 A1 | 9/2014 | Gulwani et al. | |
| 2015/0019216 A1 | 1/2015 | Singh et al. | |
| 2015/0089297 A1 | 3/2015 | Johnson et al. | |
| 2015/0095312 A1 | 4/2015 | Gulwani et al. | |
| 2015/0254211 A1 | 9/2015 | Gulwani et al. | |
| 2015/0254353 A1 | 9/2015 | Gulwani et al. | |
| 2015/0254530 A1 | 9/2015 | Gulwani et al. | |
| 2015/0331416 A1 | 11/2015 | Feniello et al. | |
| 2016/0103662 A1* | 4/2016 | Di Balsamo | G06F 8/36 717/107 |
| 2016/0299744 A1 | 10/2016 | Kalai et al. | |
| 2016/0314408 A1 | 10/2016 | Gulwani et al. | |
| 2016/0350276 A1 | 12/2016 | Gulwani et al. | |
| 2017/0075661 A1 | 3/2017 | Gulwani et al. | |
| 2017/0091589 A1 | 3/2017 | Gulwani et al. | |
| 2017/0212829 A1* | 7/2017 | Bales | G06F 11/3612 |
| 2017/0220673 A1 | 8/2017 | Gulwani et al. | |
| 2018/0039693 A1 | 2/2018 | Singh et al. | |
| 2018/0113848 A1 | 4/2018 | Gulwani et al. | |
| 2018/0113873 A1 | 4/2018 | Gulwani et al. | |
| 2018/0113887 A1 | 4/2018 | Le et al. | |
| 2018/0113890 A1 | 4/2018 | Raza et al. | |
| 2018/0113894 A1 | 4/2018 | Raza et al. | |
| 2018/0113906 A1 | 4/2018 | Gulwani et al. | |
| 2018/0113907 A1 | 4/2018 | Gulwani et al. | |
| 2018/0113922 A1 | 4/2018 | Gulwani et al. | |
| 2018/0121525 A1 | 5/2018 | Simmons et al. | |
| 2018/0150500 A1* | 5/2018 | Le | G06F 16/254 |
| 2018/0150554 A1 | 5/2018 | Le et al. | |
| 2018/0188897 A1 | 7/2018 | Gulwani et al. | |
| 2018/0246915 A1 | 8/2018 | Singh et al. | |
| 2019/0034437 A1 | 1/2019 | Gulwani et al. | |
| 2019/0171422 A1 | 6/2019 | Udupa et al. | |
| 2019/0212989 A1 | 7/2019 | Polozov et al. | |
| 2019/0235842 A1 | 8/2019 | Raza et al. | |
| 2019/0303107 A1* | 10/2019 | Kelly | G06N 20/20 |
| 2019/0311004 A1 | 10/2019 | Gulwani et al. | |
| 2019/0311022 A1 | 10/2019 | Fan et al. | |
| 2019/0318366 A1* | 10/2019 | Carranza | G06F 16/285 |
| 2019/0324730 A1 | 10/2019 | Gulwani et al. | |
| 2019/0324744 A1* | 10/2019 | Alam | G06F 17/11 |
| 2019/0332704 A1 | 10/2019 | Gulwani et al. | |
| 2019/0347267 A1 | 11/2019 | Le et al. | |
| 2019/0384763 A1 | 12/2019 | Malak et al. | |
| 2019/0384851 A1 | 12/2019 | Le et al. | |

OTHER PUBLICATIONS

Risabh Sing, et al., "Transforming Spreadsheet Data Types Using Examples", retrieved from <<http://people.csail.mit.edu/rishabh/papers/popl16-semantic.pdf>>, 2016, 14 pages.

Risabh Sing, et al., "Synthesizing Number Transformations from Input-Output Examples", retrieved from <<https://www.microsoft.com/en-us/research/wp-content/uploads/2016/06/cav12-1-1.pdf>>, 2016, 18 pages.

Risabh Sing, et al., "Learning Semantic String Transformations from Examples", retrieved from <<http://vldb.org/pvldb/vol5/p740_rishabhsingh_vldb2012.pdf>>, 2012, 12 pages.

Lars Vogel, "Regular expressions in Java—Tutorial", retrieved from <<https://www.vogella.com/tutorials/JavaRegularExpressions/article.html>>, 2019, 15 pages.

"Document.querySelector()", retrieved from <<https://developer.mozilla.org/en-US/docs/Web/API/Document/querySelector>>, no later than Apr. 1, 2020, 16 pages.

"Microsoft Program Synthesis using Examples SDK", retrieved from <<https://microsoft.github.io/prose/>>, no later than Apr. 1, 2020, 2 pages.

"Tutorial", retrieved from <<https://microsoft.github.io/prose/documentation/prose/tutorial/>>, no later than Apr. 1, 2020, 13 pages.

"Intelligent code completion", retrieved from <<https://en.wikipedia.org/wiki/Intelligent_code_completion>>, Jan. 24, 2020, 5 pages.

"Autocomplete", retrieved from <<https://en.wikipedia.org/wiki/Autocomplete>>, Mar. 12, 2020, 8 pages.

"Integrated development environment", retrieved from <<https://en.wikipedia.org/wiki/Integrated_development_environment>>, Feb. 11, 2020, 4 pages.

Amanda Silver, "Introducing Visual Studio IntelliCode", retrieved from <<https://devblogs.microsoft.com/visualstudio/introducing-visual-studio-intellicode/>>, May 7, 2018, 5 pages.

Anders Miltner, et al., "On the Fly Synthesis of Edit Suggestions", retrieved from <<https://www.microsoft.com/en-us/research/uploads/prod/2019/08/PBE-OOPSLA-2019.pdf>>, 2019, 29 pages.

Gabriele Tomassetti, "A Guide to Code Generation", retrieved from <<https://tomassetti.me/code-generation/>>, May 9, 2018, 33 pages.

"Pick the right tools for .NET development", retrieved from <<https://www.jetbrains.com/dotnet/promo/tools/>> no later than Apr. 2, 2020, 5 pages.

"PyCharm", retrieved from <<https://en.wikipedia.org/wiki/PyCharm>>, Feb. 29, 2020, 3 pages.

"Eclipse (software)", retrieved from <<https://en.wikipedia.org/wiki/Eclipse_(software)>>, Mar. 31, 2020, 12 pages.

Ian Drosos, et al., "Wrex: A Unifed Programming-by-Example Interaction for Synthesizing Readable Code for Data Scientists", retrieved from <<https://www.microsoft.com/en-us/research/uploads/prod/2020/03/chi20c-sub4932-cam-16.pdf>>, no later than Apr. 2, 2020, 12 pages.

"Find patterns in strings with the Microsoft PROSE Code Accelerator SDK", retrieved from <<https://docs.microsoft.com/en-us/python/api/overview/azure/prose/findpatterns?view=prose-py-latest>>, Sep. 24, 2018, 7 pages.

"Programming language", retrieved from <<https://en.wikipedia.org/wiki/Programming_language>>, Apr. 14, 2020, 22 pages.

Nicholas Samuel, "How to Format Dates in Python", retrieved from <<https://stackabuse.com/how-to-format-dates-in-python/>>, no later than Apr. 17, 2020, 16 pages.

Beau Carnes, "The Python Modulo Operator—What Does the % Symbol Mean in Python? (Solved)", retrieved from <<https://www.freecodecamp.org/news/the-python-modulo-operator-what-does-the-symbol-mean-in-python-solved/>>, Dec. 29, 2019, 6 pages.

"What is $1 and $2 in Regular Expressions?", retrieved from <<https://stackoverflow.com/questions/19141069/what-s-1-and-2-in-regular-expressions/19141152#19141152>>, Oct. 2, 2013, 3 pages.

(56) References Cited

OTHER PUBLICATIONS

"EditPad Lite: Basic Text Editor with Full Regular Expression Support", retrieved from <<https://www.regular-expressions.info/editpadlite.html>>, Mar. 20, 2020, 2 pages.

"Structural search and replace", retrieved from <<https://web.archive.org/web/20191209221136/https:/www.jetbrains.com/help/idea/structural-search-and-replace.html>>, Dec. 9, 2019, 9 pages.

Zhengong Cai, et al., "A Pattern-Based Code Transformation Approach for Cloud Application Migration", retrieved from <<https://docplayer.net/18105214-A-pattern-based-code-transformation-approach-for-cloud-application-migration.html>>, no later than Apr. 14, 2020, 8 pages.

Alberto Bartoli, et al., "Automatic Synthesis of Regular Expressions from Examples", retrieved from <<https://arts.units.it/retrieve/handle/11368/2758954/57751/2014-Computer-AutomaticSynthesisRegexExamples%20(2).pdf>>, Jul. 5, 2013, 16 pages.

Alberto Bartoli, et al., "Inference of Regular Expressions for Text Extraction from Examples", retrieved from <<https://www.human-competitive.org/sites/default/files/bartoli-delorenzo-medvet-tarlao-tkde-paper.pdf>>, May 2016, 14 pages.

Alvis Brazma, "Efficient Identification of Regular Expressions from Representative Examples", retrieved from <<https://dl.acm.org/doi/pdf/10.1145/168304.168340?download=true>>, 1993, 7 pages.

Xinyu Wang, et al., "FIDEX: Filtering Spreadsheet Data using Examples", retrieved from <<https://www.microsoft.com/en-us/research/wp-content/uploads/2016/12/oopsla16-spreadsheet.pdf>>, 2016, 20 pages.

Saswat Padhi, et al., "FlashProfile: A Framework for Synthesizing Data Profiles", retrieved from <<https://www.microsoft.com/en-us/research/publication/flashprofile-a-framework-for-synthesizing-data-profiles/>>, 2018, 2 pages.

Saswat Padhi, et al., "FlashProfile: A Framework for Synthesizing Data Profiles", retrieved from <<https://alexpolozov.com/papers/oopsla2018-flashprofile.pdf>>, 2018, 28 pages.

"FIDEX: Filtering Spreadsheet Data using Examples", retrieved from <<https://www.youtube.com/watch?v=4-AjWkRGHC4>>, 2016, 1 page.

"IntelliCode suggestions", retrieved from <<https://docs.microsoft.com/en-us/visualstudio/intellicode/intellicode-suggestions>>, Apr. 8, 2019, 3 pages.

"Quick Actions", retrieved from <<https://docs.microsoft.com/en-us/visualstudio/ide/quick-actions?view=vs-2019>>, Mar. 28, 2018, 3 pages.

"Overview of source code analyzers", retrieved from <<https://docs.microsoft.com/en-us/visualstudio/code-quality/roslyn-analyzers-overview?view=vs-2019>>, Oct. 3, 2019, 5 pages.

"International Search Report and Written Opinion Issued in PCT Application No. PCT/US2021/029035", dated Aug. 5, 2021, 13 Pages.

* cited by examiner

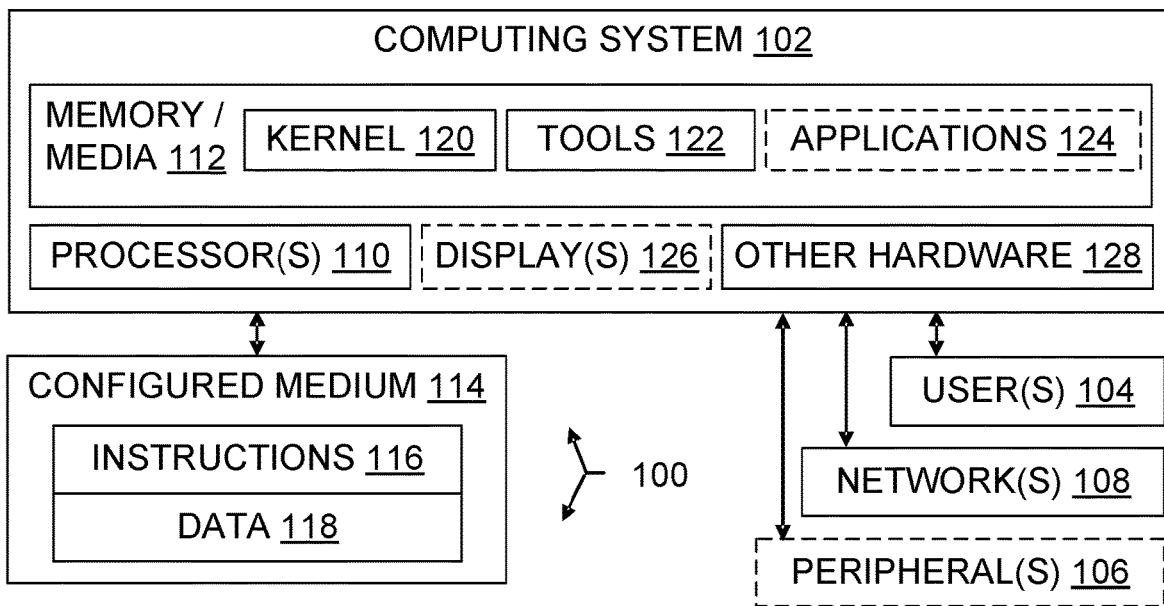

SOFTWARE DEVELOPMENT AUTOCREATED SUGGESTION PROVENANCE

BACKGROUND

Computer software is written in computer programming languages, which may also be referred to as "programming languages" or even as "languages" when the context excludes "natural languages" such as English, Spanish, Chinese, and so on. Computer software in this textual form is often called "source code". To allow execution of the software in a computing system, the source code is translated into "machine language" that is recognized by the processing chips and other hardware of the computing system. Translation may be done by tools which are themselves computer programs, known individually as "compilers" or "interpreters" and collectively as "translators". To permit translation, source code must conform with syntax rules (rules of form) that are enforced by the translator. To perform operations that produce the intended results of program execution, the source code must also properly implement those operations in a manner that is consistent with the semantics (rules of meaning) of the programming language. "Developers" are people who write or modify source code in an effort to achieve the desired semantics within the desired syntax while also meeting other goals, e.g., execution speed targets, limits on computing resource usage, ease of use, reliability, and so on.

The foregoing is merely an introduction. For instance, previously translated software in the form of libraries, operating systems, or hypervisors may also be invoked or otherwise relied upon by a given program. But even when previously translated software is available, developers are often called upon to create new source or to modify existing source code. Accordingly, technologies that help developers edit source code to achieve their desired semantics within a given syntax, and to meet other goals, may be worth investigating.

SUMMARY

Code synthesizers can automatically create source code editing suggestions, sometimes doing so in large quantities which may or may not have much diversity in form or effect. A code editing suggestion created by a code synthesizer or by machine intelligence may be referred to as an "autocreated suggestion", an "autocreated code editing suggestion", an "autocreated source code editing suggestion", an "automatically created software development suggestion", or an "ACSDS", for example. Such autocreated suggestions may be presented to developers in autocompletion interfaces or quick action (e.g., "lightbulb") interfaces of software development tools, but presenting each and every created suggestion could rapidly overwhelm and frustrate developers as they try to decide which suggestions are trustworthy.

Some embodiments described in this document provide improved technology for software development, which can increase developer productivity and code consistency, by determining automatically which autocreated coding suggestions are presented to developers. Some embodiments automatically manage autocreated suggestions by identifying suggestions that have been endorsed by a developer's team and filtering out ones that have not been endorsed, based for instance on a trust score. Some ACSDS filters can operate within and enhance existing development team practices of code review, and enhance existing editors or code review tools. Some ACSDS filter embodiments decrease or eliminate developer configuration burdens while increasing or maximizing consistent implementation of endorsed changes inside a codebase.

Some embodiments use or provide a software development hardware and software combination which includes a digital memory, and a processor which is in operable communication with the memory. The processor is configured, e.g., by tailored software, to perform suggestion filtering steps. The steps may include automatically (a) obtaining provenance metadata of an automatically created software development suggestion (ACSDS), the provenance metadata indicating implicit or explicit software developer endorsement of the ACSDS, (b) assigning a provenance-derived trust score to the ACSDS based at least in part on the provenance metadata, (c) comparing the provenance-derived trust score to a criterion for supplying the ACSDS to a suggestion presentation interface of a software development tool, and (d) supplying the ACSDS to the suggestion presentation interface or withholding the ACSDS from the suggestion presentation interface, in response to a result of the comparing. This example system tends to present automatically created suggestions to software developers more often or less often depending on whether other software developers have or have not at least implicitly endorsed the automatically created suggestions.

Some embodiments use or provide steps of a software development tool method. The steps may include obtaining provenance metadata of an ACSDS, ascertaining at least one provenance value at least in part by using the metadata, computing a provenance-derived trust score for the ACSDS based at least in part on a result of the ascertaining, assigning the provenance-derived trust score to the ACSDS, and employing the provenance-derived trust score within a software development tool.

For these embodiments, some examples of ascertained provenance values may include: a codebase utilization level which indicates an extent to which the ACSDS has been utilized within a codebase; a codebase utilizer identity which identifies at least one developer who submitted one or more suggestion-based changes to a codebase, each suggestion-based change including a software implementation of the ACSDS; a developer review level which indicates an extent to which the ACSDS has been reviewed by at least one developer; a suggestion saver identity which identifies at least one developer who chose to save the ACSDS instead of discarding it; a library affiliation which indicates that the ACSDS is affiliated with a library by an authorized author of the library or an authorized distributor of the library; or a repository affiliation which indicates that the ACSDS is affiliated with a code repository by an authorized user of the repository.

Some embodiments use or provide a computer-readable storage medium configured with data and instructions, or use other computing items, which upon execution by a processor cause a computing system to perform a suggestion filtering method. In particular, some embodiments obtain provenance metadata of an ACSDS. The provenance metadata includes a codebase utilization level which indicates an extent to which the ACSDS has been utilized within at least one codebase. These embodiments assign a provenance-derived trust score to the ACSDS based at least in part on the provenance metadata, and compare the provenance-derived trust score to a criterion for supplying the ACSDS to a suggestion presentation interface of a software development tool. Then the embodiments either supply the ACSDS to the suggestion presentation interface of a software development tool or withhold the ACSDS from the suggestion presentation interface, in response to a result of the comparing.

Other technical activities and characteristics pertinent to teachings herein will also become apparent to those of skill in the art. The examples given are merely illustrative. This Summary is not intended to identify key features or essential features of the claimed subject matter, nor is it intended to be used to limit the scope of the claimed subject matter. Rather, this Summary is provided to introduce—in a simplified form—some technical concepts that are further described below in the Detailed Description. The innovation is defined with claims as properly understood, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

FIG. 1 is a block diagram illustrating computer systems generally and also illustrating configured storage media generally;

FIG. 2 is a block diagram illustrating a computing system equipped with autocreated suggestion filtering functionality, and some aspects of a surrounding context;

FIG. 3 is a block diagram illustrating an enhanced computing system configured for presentation of proactively and automatically filtered autocreated code editing suggestions;

DETAILED DESCRIPTION

Overview

Figure 4:
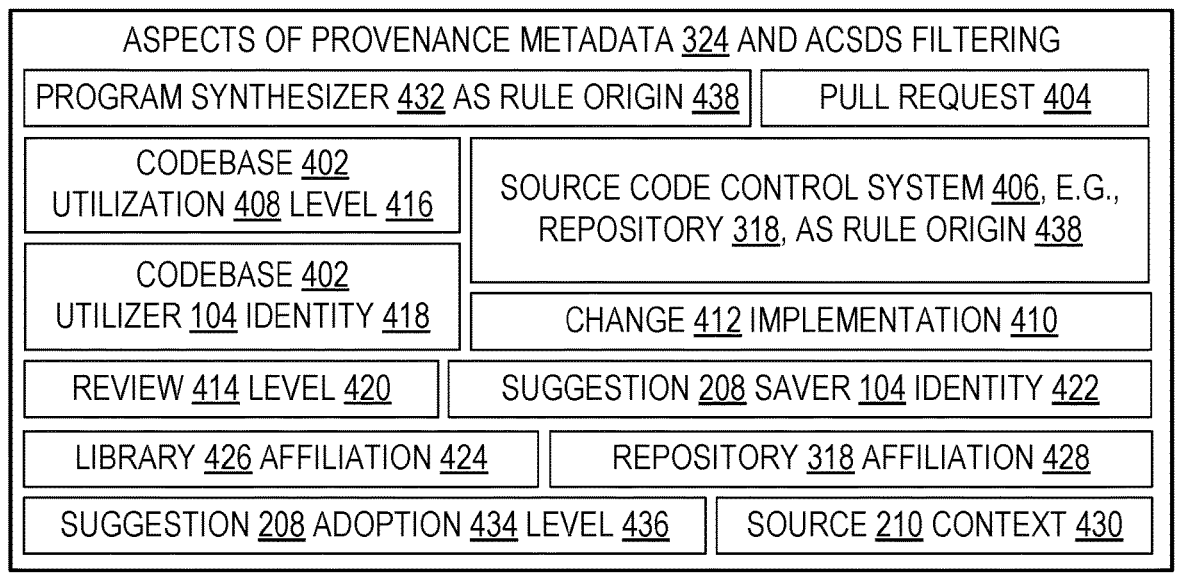
FIG. 4 is a block diagram illustrating some aspects of suggestion provenance metadata and suggestion filtering.

Innovations may expand beyond their origins, but understanding an innovation's origins can help one more fully appreciate the innovation. In the present case, some teachings described herein were motivated by technical challenges faced by Microsoft innovators who were working to improve the feature set and usability of Microsoft development tool offerings, including some versions of Microsoft Visual Studio® or VSCode™ integrated development environments (marks of Microsoft Corporation).

Initially, the innovators recognized that program synthesis technology, such as Microsoft PROSE™ technology and other machine intelligence technologies, can be used to automatically create suggestions for software edits. These autocreated suggestions can be displayed to a software developer, e.g., in the form of an IntelliCode™ menu item or another autocompletion or quick action suggestion in an integrated development environment tool or a text editor, for example (marks of Microsoft Corporation).

In some situations, the autocreated suggestions are synthesized or otherwise derived from edits made by a particular developer and are then displayed to the same developer. For example, after determining that a developer has changed, in a particular way, several instances of source code that match a certain pattern, when the next instance of that pattern is encountered during an editing session the editing tool may recognize the instance and then proactively offer the developer an option to change the instance in the same way the earlier instances were changed. Recognition of the pattern may be more general than a simple string comparison; regular expressions may be matched, for example.

On further consideration, the innovators recognized that the potential presentation or actual presentation or use of autocreated suggestions could be challenging when more than one developer is working on a given application program or another shared codebase. For example, one technical challenge faced by the innovators was how to determine whether an autocreated suggestion that was generated to assist one developer would be presented later to another developer. Emergent associated technical challenges were how to configure control over autocreated suggestion presentation, how to integrate autocreated suggestion presentation into existing developer tools and workflows, what origination or other information would be maintained about autocreated suggestions, and whether to present some or all of that information along with the suggestion when the suggestion is presented to a developer in a tool.

One goal of some resulting embodiments is to avoid flooding a developer with unwanted autocreated suggestions. Another goal of some resulting embodiments is to avoid burdening a developer with responsibility for configuring the management of autocreated suggestions; freed of configuration burdens, the developer can concentrate instead on code development. One of skill will recognize these and other technical challenges of managing autocreated suggestions in development team environments, as challenges are addressed at various points within the present disclosure.

To help address such technical challenges, some embodiments compute a trust score for autocreated suggestions. The trust score is based on metadata that indicate the extent (at least) and possibly also the nature of any endorsement, by other developers, of an autocreated suggestion. As used here, "developer" means a software developer who is a human person, as opposed to being a software process or computing device, for example. Endorsement of an autocreated suggestion may take various forms, such as developer review of the autocreated suggestion, submission to a repository of changes that were made when adopting the autocreated suggestion, or an affiliation of the autocreated suggestion with a library release as a suggested way to update library-using code that would otherwise be broken by changes made in the library release. The trust score may be viewed as a provenance-derived trust score, because it is based on the provenance (i.e., the origin or history or both) of the autocreated suggestion and its usage.

Some embodiments compare the trust score to a cutoff. Then they either present the autocreated suggestion to the developer as an option, if it is sufficiently trustworthy, or else withhold it from presentation, if it is not. Filtering suggestions based on endorsement metadata helps prevent a development tool from overwhelming the developer with autocreated suggestions, and helps the developer understand the provenance of such suggestions. Even though some of the withheld autocreated suggestions may be harmless, or would even be helpful, if they have not been sufficiently endorsed they are automatically withheld from view. Thus, the developer is not compelled to either sort manually through many autocreated suggestions to find the most useful ones, or to individually define and tune an ad hoc filter mechanism to categorize the autocreated suggestions. Presenting endorsed suggestions also promotes consistency of code within a given codebase; in effect, embodiments can help developers see and comply with a "this is how we do it" team approach to coding.

Other aspects of these embodiments, and other enhanced software development tool embodiments, are also described herein.

Operating Environments

With reference to FIG. 1, an operating environment 100 for an embodiment includes at least one computer system 102. The computer system 102 may be a multiprocessor computer system, or not. An operating environment may include one or more machines in a given computer system, which may be clustered, client-server networked, and/or peer-to-peer networked within a cloud. An individual machine is a computer system, and a network or other group of cooperating machines is also a computer system. A given computer system 102 may be configured for end-users, e.g., with applications, for administrators, as a server, as a distributed processing node, and/or in other ways.

Human users 104 may interact with the computer system 102 by using displays, keyboards, and other peripherals 106, via typed text, touch, voice, movement, computer vision, gestures, and/or other forms of I/O. A screen 126 may be a removable peripheral 106 or may be an integral part of the system 102. A user interface may support interaction between an embodiment and one or more human users. A user interface may include a command line interface, a graphical user interface (GUI), natural user interface (NUI), voice command interface, and/or other user interface (UI) presentations, which may be presented as distinct options or may be integrated.

System administrators, network administrators, cloud administrators, security analysts and other security personnel, operations personnel, developers, testers, engineers, auditors, and end-users are each a particular type of user 104. Automated agents, scripts, playback software, devices, and the like acting on behalf of one or more people may also be users 104, e.g., to facilitate testing a system 102. Storage devices and/or networking devices may be considered peripheral equipment in some embodiments and part of a system 102 in other embodiments, depending on their detachability from the processor 110. Other computer systems not shown in FIG. 1 may interact in technological ways with the computer system 102 or with another system embodiment using one or more connections to a network 108 via network interface equipment, for example.

Each computer system 102 includes at least one processor 110. The computer system 102, like other suitable systems, also includes one or more computer-readable storage media 112. Storage media 112 may be of different physical types. The storage media 112 may be volatile memory, non-volatile memory, fixed in place media, removable media, magnetic media, optical media, solid-state media, and/or of other types of physical durable storage media (as opposed to merely a propagated signal or mere energy). In particular, a configured storage medium 114 such as a portable (i.e., external) hard drive, CD, DVD, memory stick, or other removable non-volatile memory medium may become functionally a technological part of the computer system when inserted or otherwise installed, making its content accessible for interaction with and use by processor 110. The removable configured storage medium 114 is an example of a computer-readable storage medium 112. Some other examples of computer-readable storage media 112 include built-in RAM, ROM, hard disks, and other memory storage devices which are not readily removable by users 104. For compliance with current United States patent requirements, neither a computer-readable medium nor a computer-readable storage medium nor a computer-readable memory is a signal per se or mere energy under any claim pending or granted in the United States.

The storage medium 114 is configured with binary instructions 116 that are executable by a processor 110; "executable" (and "execution") are used in a broad sense herein to include (running) machine code, interpretable code, bytecode, and/or code that runs on a virtual machine, for example. The storage medium 114 is also configured with data 118 which is created, modified, referenced, and/or otherwise used for technical effect by execution of the instructions 116. The instructions 116 and the data 118 configure the memory or other storage medium 114 in which they reside; when that memory or other computer readable storage medium is a functional part of a given computer system, the instructions 116 and data 118 also configure that computer system. In some embodiments, a portion of the data 118 is representative of real-world items such as product characteristics, inventories, physical measurements, settings, images, readings, targets, volumes, and so forth. Such data is also transformed by backup, restore, commits, aborts, reformatting, and/or other technical operations.

Although an embodiment may be described as being implemented as software instructions executed by one or more processors in a computing device (e.g., general purpose computer, server, or cluster), such description is not meant to exhaust all possible embodiments. One of skill will understand that the same or similar functionality can also often be implemented, in whole or in part, directly in hardware logic, to provide the same or similar technical effects. Alternatively, or in addition to software implementation, the technical functionality described herein can be performed, at least in part, by one or more hardware logic components. For example, and without excluding other implementations, an embodiment may include hardware logic components 110, 128 such as Field-Programmable Gate Arrays (FPGAs), Application-Specific Integrated Circuits (ASICs), Application-Specific Standard Products (ASSPs), System-on-a-Chip components (SOCs), Complex Programmable Logic Devices (CPLDs), and similar components. Components of an embodiment may be grouped into interacting functional modules based on their inputs, outputs, and/or their technical effects, for example.

In addition to processors 110 (e.g., CPUs, ALUs, FPUs, TPUs and/or GPUs), memory/storage media 112, and displays 126, an operating environment may also include other hardware 128, such as batteries, buses, power supplies, wired and wireless network interface cards, for instance. The nouns "screen" and "display" are used interchangeably herein. A display 126 may include one or more touch screens, screens responsive to input from a pen or tablet, or screens which operate solely for output. In some embodiments peripherals 106 such as human user I/O devices (screen, keyboard, mouse, tablet, microphone, speaker, motion sensor, etc.) will be present in operable communication with one or more processors 110 and memory.

In some embodiments, the system includes multiple computers connected by a wired and/or wireless network 108. Networking interface equipment 128 can provide access to networks 108, using network components such as a packet-switched network interface card, a wireless transceiver, or a telephone network interface, for example, which may be present in a given computer system. Virtualizations of networking interface equipment and other network components such as switches or routers or firewalls may also be present, e.g., in a software-defined network or a sandboxed or other secure cloud computing environment. In some embodiments, one or more computers are partially or fully "air gapped" by reason of being disconnected or only intermittently connected to another networked device or remote cloud or enterprise network. In particular, autocreated suggestion filtering functionality could be installed on an air gapped network and then be updated periodically or on occasion using removable media. A given embodiment may also communicate technical data and/or technical instructions through direct memory access, removable non-volatile storage media, or other information storage-retrieval and/or transmission approaches.

One of skill will appreciate that the foregoing aspects and other aspects presented herein under "Operating Environments" may form part of a given embodiment. This document's headings are not intended to provide a strict classification of features into embodiment and non-embodiment feature sets.

One or more items are shown in outline form in the Figures, or listed inside parentheses, to emphasize that they are not necessarily part of the illustrated operating environment or all embodiments, but may interoperate with items in the operating environment or some embodiments as discussed herein. It does not follow that items not in outline or parenthetical form are necessarily required, in any Figure or any embodiment. In particular, FIG. 1 is provided for convenience; inclusion of an item in FIG. 1 does not imply that the item, or the described use of the item, was known prior to the current innovations.

More about Systems

FIGS. 2 through 6 illustrate aspects of an environment having an enhanced system 202, 102 with a software development tool 204 that includes filtering functionality 206. Specifically, as shown in FIG. 2 the tool 204 includes functionality 206 for filtering autocreated suggestions 208 to control which suggestions 208 are presented to a developer 104 in conjunction with source code 210 displayed in a user interface 212 of the development tool 204.

The suggestions 208 are created by a code synthesizer, by a machine intelligence-driven code generator, or by another mechanism 216, as opposed to being conceived by a human. For example, machine intelligence may be used to find patterns in a set of code changes. In general, some of the autocreated suggestions 208 will be adopted to a large extent by developers, while other suggestions will be adopted less or not at all. A suggestion is "adopted" when a developer (or a tool performing a command from the developer) applies the suggestion to modify the code 210. One benefit of some embodiments is increased adoption of suggestions 208 that have been endorsed by prior review or adoption elsewhere. Another benefit of some embodiments is reduction or avoidance of time and effort spent by developers on considering non-endorsed autocreated suggestions 208.

The developer 104 who is editing or reviewing the source code 210 may be the only developer responsible for working on that code 210, but it is also contemplated that in many of the scenarios that can benefit from teachings herein the developer will be a member of a multi-person development team 214. In a team 214 development scenario, one or more developers may be responsible for development of a particular source code file, e.g., responsible for writing, modifying, documenting, reviewing, analyzing, correcting, testing, or otherwise performing software development actions with the code in the file. Even if a particular developer is the only person currently responsible for a particular file of source code 210 which is being displayed, that source code is often part of a larger codebase 402 that is collectively edited, reviewed, or otherwise developed by multiple members of the team. One benefit of some embodiments is greater consistency in the adoption of particular autocreated suggestions 208 by different developers within a given codebase.

FIG. 3 illustrates embodiments in which the filtering functionality 206 includes suggestion presentation software 302. From a user interface design perspective, the suggestion presentation software 302 may look and operate largely like a non-enhanced tool, but differences will become apparent. One difference in many embodiments is the presence and operation of filter code 304 that tests suggestions' 208 trust scores 306 against one or more filter criteria 308, rather than simply allowing all suggestions 208 to be displayed to users. Another difference in some embodiments is the display of suggestion metadata 324. Still other differences will be apparent to one of skill in view of the present disclosure.

The teachings provided herein can be applied to enhance many kinds of development tools 204. These teachings can be applied to help developers as they work with source code 210 in various programming languages, such as C#, C++, Objective-C, Fortran, COBOL, Java, Python, Perl, or another general-purpose programming language, other imperative general purpose languages, declarative languages, or even special-purpose languages such as those used for string formatting, document object model component selection, or other purposes.

In some embodiments, an enhanced tool includes a source code editor 310. In some, the enhanced tool 204 includes a code analyzer 312, e.g., a static analysis tool 122 such as a Microsoft Roslyn™ analyzer (mark of Microsoft Corporation) enhanced with functionality 206, or a code review tool 312, e.g., a pull request 404 review tool 122 enhanced with functionality 206. In some embodiments the enhanced tool 204 includes data 320 which was generated through interaction with a code repository 318, such as one using GitHub® (mark of GitHub, Inc.), BitBucket® (mark of Atlassian Pty Ltd), SourceForge® (mark of SourceForge Media, LLC), or other repository software 316. Pull requests 404 are one example of repository data 320; source code 210 sent to or retrieved from a repository are another example of repository data 320, since any data 118 sent or received through communication with a repository 318 is deemed repository data 320 herein. In some of these cases, and in others, the enhanced tool 204 may be, or be within, or include, an integrated development environment 314.

The editors 310, analyzers 312, repository tools 316, IDEs 314, and other tools 204 which are enhanced according to teachings presented herein include or communicate with a user interface 212 that configures a visible display 126. The filtering functionality 206 code 304 executes to influence or otherwise control which autocreated suggestions 208 will be shown on that display 126 by the user interface 212, and to influence or otherwise control what metadata 324 about the provenance 326 of the suggestions 208 is used in the filtering. The filtering functionality 206 also controls what provenance metadata 324 is shown on the display in order to help developers understand and assess autocreated suggestions 208.

In some embodiments the suggestion presentation software 302 is designed and configured to comfortably enhance an existing development workflow. Such "comfortable enhancement" may be accomplished, e.g., by virtue of an embodiment having one or more of the following characteristics: (a) not requiring a developer to consult guidance outside the development tool 204 user interface 212 to decide whether to adopt an autocreated suggestion 208, (b) enhancing one or more familiar development functionalities such as source code editing, autocompletion, quick actions (a.k.a. "lightbulb" actions, "code actions", or "quick fixes"), or source code analysis, (c) utilizing familiar user interface mechanisms (albeit in new ways) such as dialog boxes, tooltips, cursors, visual highlighting, and flowing of text in response to text insertion, or (d) presenting endorsed autocreated suggestions at the point in a tool 204 where they are most useful.

The system 202 may be networked generally or communicate via network packets, shared memory, shared files, or otherwise with a cloud, a repository 318 or other source code control system 406, other network(s) 108, and other computing devices through one or more interfaces 322. An interface 322 may include hardware such as network interface cards, software such as network stacks, APIs, or sockets, combination items such as network connections, or a combination thereof.

Figure 5:
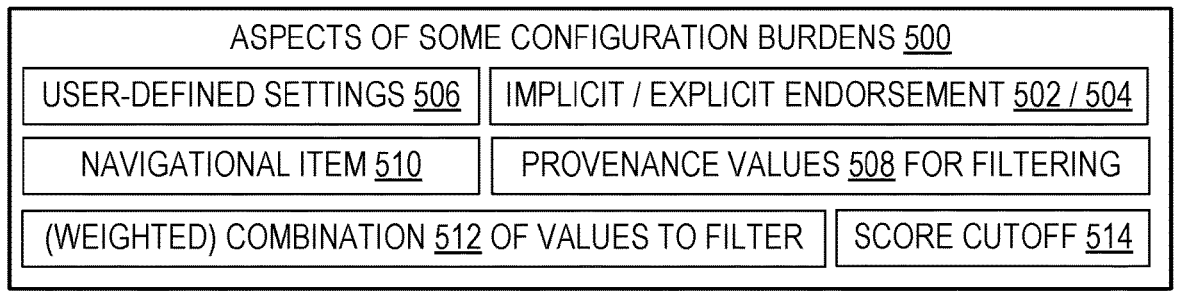
FIG. 5 is a block diagram illustrating some aspects of configuration burdens.
Figure 6:
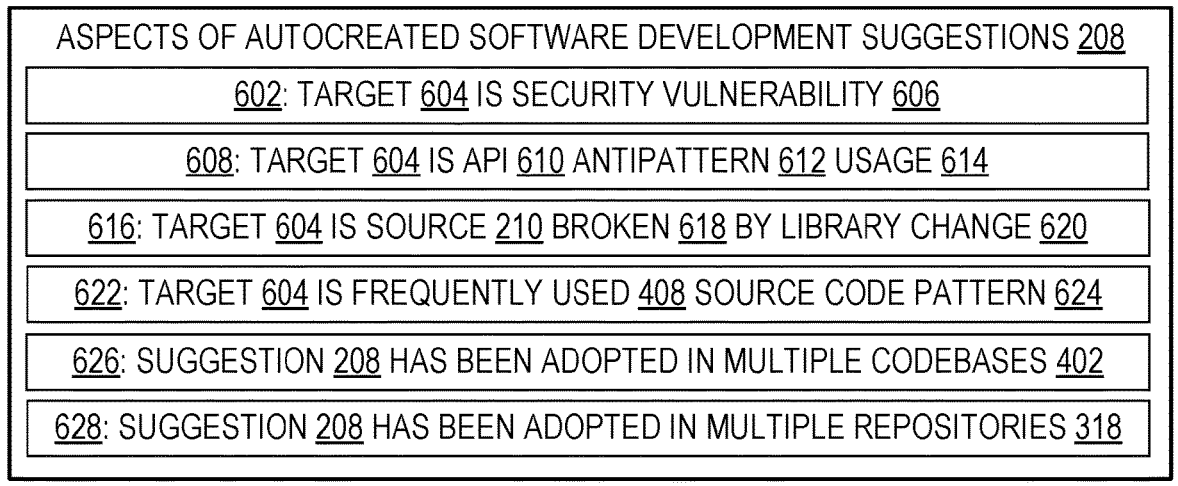
FIG. 6 is a block diagram illustrating some aspects of autocreated source code editing suggestions.

FIG. 4 illustrates some aspects of provenance metadata 324. FIG. 5 illustrates some examples of configuration burdens 500. FIG. 6 illustrates some aspects of some autocreated suggestions 208. These illustrated items are discussed at various points herein, and additional details regarding them are provided in the discussion of a List of Reference Numerals later in this disclosure document.

With reference now to all of the drawing figures, some embodiments use or provide a functionality-enhanced system, such as system 202 or another system 102 that is enhanced with suggestion filtering as taught herein. In some embodiments, a system which is configured for software development includes a digital memory 112 and a processor 110 in operable communication with the memory. The processor 110 is configured to perform suggestion filtering steps. The steps may include automatically (a) obtaining provenance metadata 324 of an automatically created software development suggestion (ACSDS) 208, the provenance metadata indicating implicit software developer endorsement 502 of the ACSDS or explicit software developer endorsement 504 of the ACSDS, (b) assigning a provenance-derived trust score 306 to the ACSDS based at least in part on the provenance metadata, (c) comparing the provenance-derived trust score to a criterion 308 for supplying the ACSDS to a suggestion presentation interface 212 of a software development tool 204, and (d) supplying the ACSDS to the suggestion presentation interface or withholding the ACSDS from the suggestion presentation interface, in response to a result of the comparing. As it gains access to autocreated suggestions over time, this enhanced system tends to present automatically created suggestions 208 to software developers more often or less often depending on whether other software developers have or have not at least implicitly endorsed the automatically created suggestions. Endorsed suggestions are more likely to be deemed by a team the kind of suggestion whose change belongs in a codebase the team is working on.

Some embodiments will comfortably enhance an existing development team workflow by favoring endorsed autocreated suggestions 208 over non-endorsed suggestions. Endorsements 502, 504 may be detected by automatically scanning logs or other output data of tools 204 whose use is already established by a development team. For instance, enhanced tools 204 may operate to support code reviews or other workflow performed by a development team or by other co-workers developing a codebase 402. Changes by team members to their established workflow behaviors (e.g., doing code reviews and submitting pull requests) are not required in order for the developed software to benefit from tool enhancements that apply suggestion filtering as taught herein.

In some embodiments, sufficiently trusted suggestions are presented in a code editor, e.g., by IntelliCode™ technology. In some, such suggestions are presented by a code analysis tool, e.g., a Roslyn™ analyzer (marks of Microsoft Corporation). Thus, in some embodiments the system 202 is characterized in at least one of the following ways: the software development tool 204 includes a source code editor 310 and the suggestion presentation interface 212 operates within the source code editor, the software development tool 204 includes a source code review tool 312 and the suggestion presentation interface 212 operates within the source code review tool, or the software development tool 204 includes a source code analysis tool 312 and the suggestion presentation interface 212 operates within the source code analysis tool.

In particular, in some embodiments the enhanced source code analysis tool 204 is configured to perform a repository pull request 404. Repository pull requests 404 are also referred to herein as "repo pulls" or "repo pull lists". Repo pull lists can be employed by an embodiment as evidence of codebase utilization 408 of a suggestion 208 endorsement 502 in the form of an implementation 410 of a change 412 to the codebase 402. The endorsement is implicit, in that changes placed in a repo by a pull request will not necessarily be included in a build, and will not necessarily be executed event if a build makes them part of an executable. Repo pull lists can also or instead be employed by an embodiment as evidence of developer review 414 of a suggestion 208, although in practice a particular change placed in a repo 318 by a pull request will not necessarily have been actually considered by the developer making the pull request 404, especially if multiple changes 412 are placed in a single pull request.

In some embodiments, the provenance metadata 324 includes at least one of the following: a codebase utilization level 416 which indicates an extent to which the ACSDS 208 has been utilized within a codebase 402; a codebase utilizer identity 418 which identifies at least one developer who submitted one or more suggestion-based changes 412 to a codebase, each suggestion-based change including a software implementation 410 of the ACSDS 208; a developer review level 420 which indicates an extent to which the ACSDS has been reviewed by at least one developer; a suggestion saver identity 422 which identifies at least one developer who chose to save the ACSDS instead of discarding it; a library affiliation 424 which indicates that the ACSDS is affiliated with a library 426 by an authorized author of the library or an authorized distributor of the library; or a repository affiliation 428 which indicates that the ACSDS is affiliated with a code repository 318 by an authorized user of the repository.

In some scenarios utilization in a codebase is indicative of human review, but an embodiment may nonetheless measure these aspects separately.

Some embodiments use evidence of utilization 408 to extract metadata 324 about developer identity, e.g., using a source code control 406 API 322. For instance, an embodiment may determine that a particular change 412 was added by Pat Coder on 29 Jun. 2020 according to a source code control query result.

In some embodiments, the codebase utilization level 416 may be Boolean, e.g., Yes: the suggestion has apparently been utilized, or No: nothing was found to indicate that the suggestion has been utilized. Alternately, the codebase utilization level 416 may be non-Boolean, e.g., it may be a count of the number of times the suggestion has apparently (based on repo pull list, log, etc. scanning) been utilized. Similarly, the developer review level 420 may be Boolean in some embodiments and non-Boolean in others. Thus, in some embodiments the system 202 is characterized in at least one of the following ways: the codebase utilization level 416 is selected from a set consisting of two values (it is Boolean), the codebase utilization level 416 is selected from a set which includes more than two values (it is not Boolean), the developer review level 420 is selected from a set consisting of two values (it is Boolean), or the developer review level is selected from a set which includes more than two values (it is not Boolean).

Some embodiments reduce or even minimize configuration burdens 500 on developers. As a result, teams of developers can receive the benefit of trustworthy autocreated suggestions without themselves curating rules that define trustworthiness. Over time, the enhanced system surfaces suggestions 208 that tend to matter to the team. Some embodiments may, however, include a settings mechanism, e.g., to let a manager indicate to the enhanced system that a rule is not being applied but should be. In some scenarios, an embodiment detects lack of use of a suggestion 208 and prompts a repo owning dev lead or other admin, to the effect that a particular rule 208 is not being used and offers an option of retiring that rule 208.

In some embodiments, the enhanced system 202 is characterized in at least one of the following ways: the suggestion presentation interface 212 operates subject to one or more user-defined settings 506, and the suggestion filtering steps operate without any additional user-defined settings; or the suggestion filtering steps operate without any user-defined settings 506 which are unique to the suggestion filtering steps. For instance, in a particular embodiment a user-defined setting may specify the maximum number of suggestions that will be shown together in a tool tip of an autocompletion feature, or a setting may determine whether a tool will show the user autocompletion suggestions that are based on repeated edits. This setting is not unique to suggestion 208 filtering because it does not bear on suggestion 208 trustworthiness. But in the same or another embodiment, a different user-defined setting may specify the number of lines of source code to display as context 430 illustrating the provenance of a given suggestion 208; this setting is unique to suggestion 208 filtering because suggestion 208 trustworthiness may depend on where the suggestion came from.

Although the teachings herein may be applied in various development environments, it is contemplated that many embodiments will be used in some scenario where the source code 210 is being edited in an IDE 314. Thus, in some embodiments the software development tool 204 includes an IDE 314. Some IDEs which are suitable for enhancement as taught herein include a Microsoft® Visual Studio® integrated development environment (Microsoft and Visual Studio are marks of Microsoft Corporation), a NetBeans® integrated development environment (NetBeans is a mark of Oracle America, Inc.), an Eclipse™ integrated development environment (Eclipse is a mark of Eclipse.org Foundation, Inc.) and other integrated development environments.

Other system embodiments are also described herein, either directly or derivable as system versions of described processes or configured media, duly informed by the extensive discussion herein of computing hardware.

Although specific architectural examples are shown in the Figures, an embodiment may depart from those examples. For instance, items shown in different Figures may be included together in an embodiment, items shown in a Figure may be omitted, functionality shown in different items may be combined into fewer items or into a single item, items may be renamed, or items may be connected differently to one another.

Examples are provided in this disclosure to help illustrate aspects of the technology, but the examples given within this document do not describe all of the possible embodiments. A given embodiment may include additional or different technical features, operation sequences, data structures, or GUI presentation functionalities, for instance, and may otherwise depart from the examples provided herein.

Processes (a.k.a. Methods)

Figure 7:
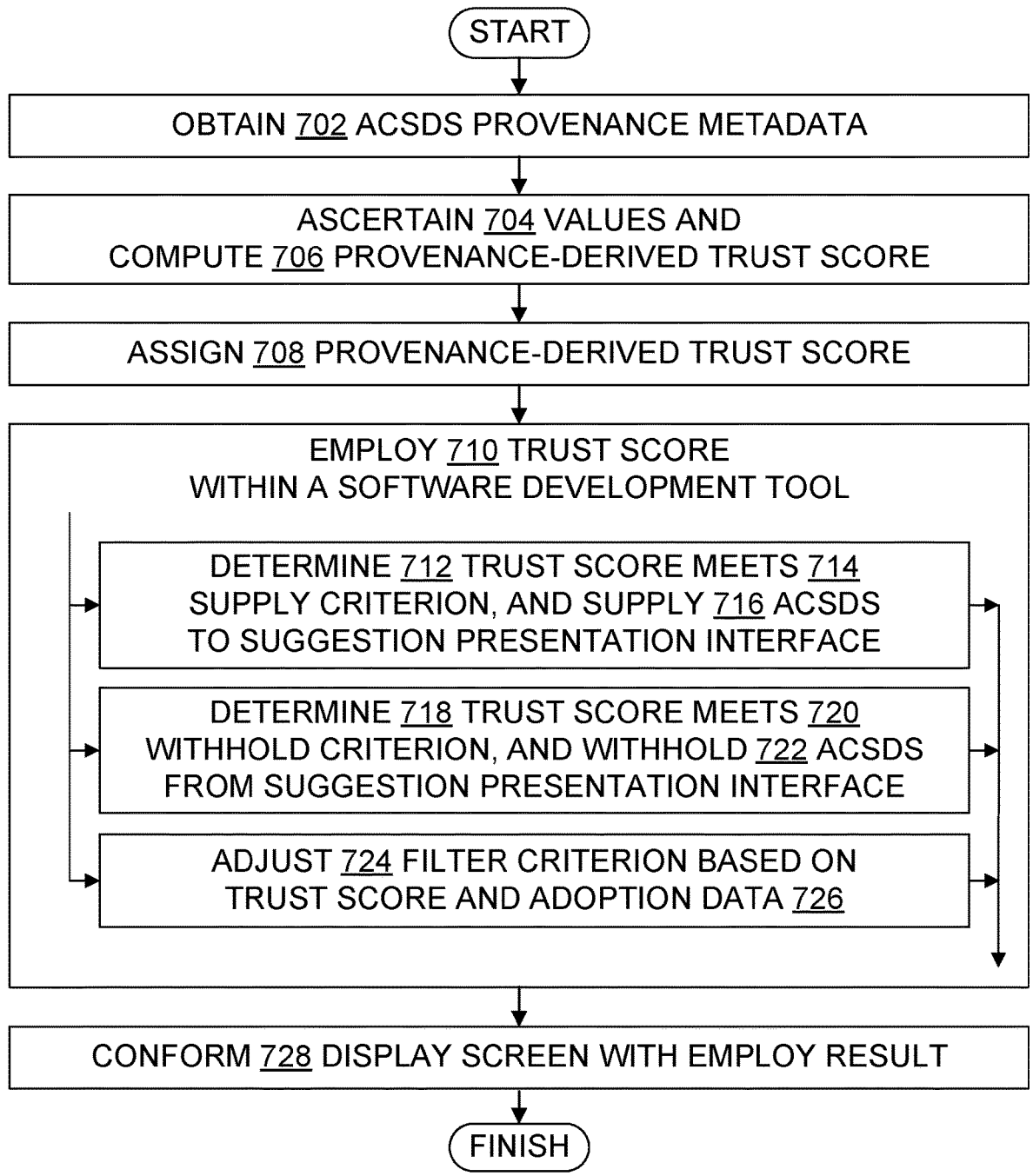
FIG. 7 is a flowchart illustrating steps in some filtered autocreated suggestion presentation methods, which are software development tool methods.
Figure 8:
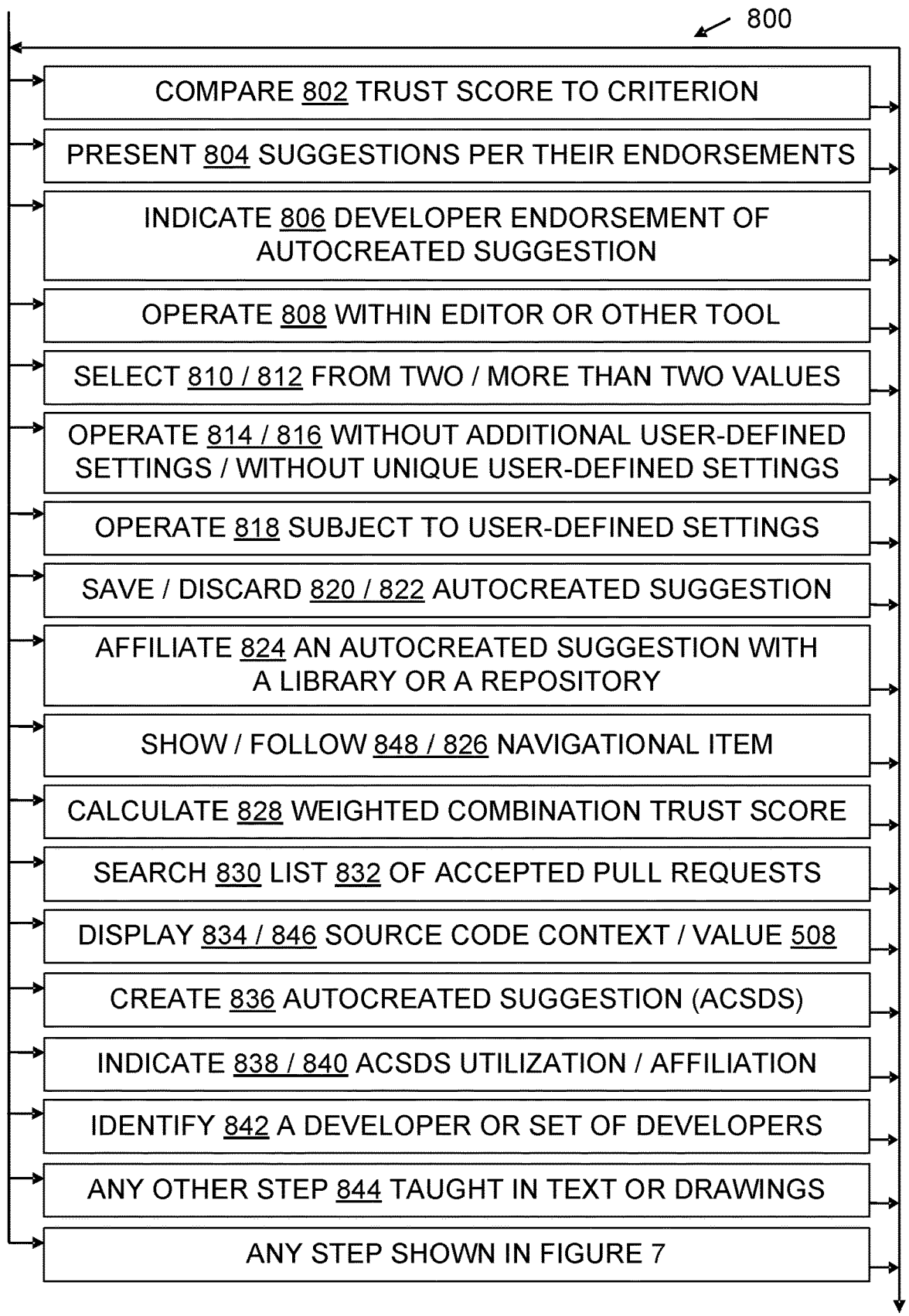
FIG. 8 is a flowchart further illustrating steps in some software development tool methods.

FIG. 7 illustrates a family of software development tool methods 700 that may be performed or assisted by an enhanced system, such as system 202 or another functionality 206 enhanced system as taught herein. FIG. 8 further illustrates software development tool methods 800 (which may also be referred to as "processes" in the legal sense of that word) that are suitable for use during operation of a system which has innovative functionality taught herein. FIG. 8 includes some refinements, supplements, or contextual actions for steps shown in FIG. 7, as well as methods which do not necessarily involve steps of FIG. 7. FIG. 8 as a whole does incorporate all steps shown in FIG. 7, as steps that may be part of a particular embodiment.

Technical processes shown in the Figures or otherwise disclosed will be performed automatically, e.g., by an enhanced system 202 or software component thereof, unless otherwise indicated. Processes may also be performed in part automatically and in part manually to the extent activity by a human person is implicated. For instance, a user 104 may set the value of a user-defined setting 506, or may enter commands which cause an enhanced tool 204 to follow 826 a navigational item 510 in order to view context 430 of an autocreated suggestion's endorsements. However, no process contemplated as innovative herein is entirely manual.

In a given embodiment zero or more illustrated steps of a process may be repeated, perhaps with different parameters or data to operate on. Steps in an embodiment may also be done in a different order than the top-to-bottom order that is laid out in FIGS. 7 and 8. Steps may be performed serially, in a partially overlapping manner, or fully in parallel. In particular, the order in which flowchart 700 or flowchart 800 operation items are traversed to indicate the steps performed during a process may vary from one performance of the process to another performance of the process. The flowchart traversal order may also vary from one process embodiment to another process embodiment. Steps may also be omitted, combined, renamed, regrouped, be performed on one or more machines, or otherwise depart from the illustrated flow, provided that the process performed is operable and conforms to at least one claim.

Some embodiments use or provide a software development tool method 700 that is suitable for performance by a software development tool 204 which has a user interface 212, including at least the following metadata obtaining 702, value ascertaining 704, score computing 706, score assigning 708, and score employing 710 steps.

During a metadata obtaining 702 step, the embodiment obtains provenance metadata 324 of an automatically created software development suggestion (ACSDS) 208. In some embodiments, metadata 324 may be obtained by scanning pull requests 404 or other source code control system 406 logs, or program synthesizer 432 or other suggestion creator mechanism 216 logs, or logs of autocompletion activity in enhanced development tools 204, for example. Scanning involves computational activity such as reading files and copying data from one digital data structure to another, as opposed to viewing by a human; logs for scanning are digital data 118, not markings on paper.

During a value ascertaining 704 step, the embodiment ascertains at least one of the following provenance values 508, at least in part by using the metadata: a codebase utilization level 416 which indicates an extent to which the ACSDS has been utilized within a codebase 402; a codebase utilizer identity 418 which identifies at least one developer who submitted one or more suggestion-based changes 412 to a codebase, each suggestion-based change including a software implementation 410 of the ACSDS; a developer review level 420 which indicates an extent to which the ACSDS has been reviewed by at least one developer; a suggestion saver identity 422 which identifies at least one developer who chose to save the ACSDS instead of discarding it; a library affiliation 424 which indicates that the ACSDS is affiliated with a library 426 by an authorized author of the library or an authorized distributor of the library; or a repository affiliation 428 which indicates that the ACSDS is affiliated with a code repository 318 by an authorized user of the repository.

In some embodiments, provenance values may be ascertained 704 by computational analysis or other processing of metadata 324. For example, suppose a suggestion 208 includes adding a new parameter to invocations of a routine foo( ). Then a codebase utilization level 416 could be calculated by counting the number of pull requests that include an edit to "foo". This could overestimate the actual utilization, because other changes unrelated to the particular suggestion might also edit foo( ) for other reasons. But codebase utilization level 416 and other provenance values can be beneficially used as taught herein even when they are not necessarily entirely accurate.

During a score computing 706 step, the embodiment computes a provenance-derived trust score 306 for the ACSDS, based at least in part on a result of the ascertaining 704. Although a normalized provenance value 508 may serve as a trust score in some embodiments, other embodiments may compute 706 a trust score as a (potentially weighted) combination 512 of normalized (or raw) provenance values 508. That is, in some embodiments computing 706 the provenance-derived trust score 306 includes calculating 828 a weighted combination 512 of at least two of the provenance values 508. In others, a single provenance value is used as a basis for the trust score. Some embodiments give greater weight to particular metadata when computing 706 a trust score, e.g., by giving more weight to suggestions 208 that have been adopted many times or in a wide variety of contexts or by a large number of developers or in a particularly often-edited codebase.

Many different trust score 306 computations 706 may be used, in various embodiments, but each computation 706 is based at least partially on provenance metadata 324. For example, in some cases the presence of code implementing a suggestion is treated as evidence that the suggestion is trusted. In some embodiments the provenance-derived trust score for an ACSDS is computed 706 based at least in part on the codebase utilization level or the repository affiliation or both.

As another example, denoted here as Scoring Example A, an embodiment may compute 706 a trust score 306 of an autocreated suggestion 208 as the number 420 of times that suggestion has been reviewed 414 by other developers (e.g., how many times it has been offered via autocompletion) plus twice the number 416 of times the suggestion has been utilized 408 by other developers (e.g., per pull request logs), divided by six. In practice, this would yield trust scores such as the following:

| # reviews | # utilizations | trust score |
| --- | --- | --- |
| 0 | 0 | 0 |
| 3 | 0 | 0.50 |
| 0 | 1 | 0.33 |
| 1 | 1 | 0.5 |
| 2 | 2 | 1.0 |
| 10 | 7 | 4.0 |

During a score assigning 708 step, the embodiment assigns the provenance-derived trust score to the ACSDS. This may be accomplished by computationally copying the computed trust score into a data structure in memory 112 that contains or points to the ACSDS 208, for example.

During a score employing 710 step, the embodiment employs the provenance-derived trust score within a software development tool 204. For example, an embodiment may employ 710 a trust score by determining 712 that the trust score meets 714 a suggestion supplying criterion 308, or by determining 718 that the trust score meets 720 a suggestion withholding criterion 308. When a supplying criterion 308 is met 714, the embodiment supplies 716 the suggestion 208 to the interface 212 for display; a developer is thus given an opportunity to adopt 434 the suggestion 208. When a withholding criterion 308 is met 720, the embodiment withholds 722 the suggestion 208 from the interface 212, by not supplying 716 the suggestion for display. The developer is thus not given an opportunity to adopt 434 the suggestion 208, but is also not going to spend time and effort deciding whether to adopt the suggestion.

As a specific example, an embodiment may employ 710 trust scores 306 and criteria 308 such that the embodiment supplies 716 the suggestion when the trust score is less than a cutoff 514. Even more specifically, an embodiment which computes 706 trust scores per Scoring Example A above, could have a cutoff 514 set to 0.8, in which case the withholding criterion 308 could be "trust score less than 0.8" and the supplying criterion 308 could be "trust score 0.8 or greater". In this hypothetical scenario, which is denoted here as Supplying Example A, the results of employing 710 the trust score to determine whether the particular suggestion 208 is supplied to the interface 212 for the interface 212 to display to a developer would be as follows:

| # reviews | # utilizations | trust score | supplied? |
| --- | --- | --- | --- |
| 0 | 0 | 0 | no |
| 3 | 0 | 0.50 | no |
| 0 | 1 | 0.33 | no |
| 1 | 1 | 0.5 | no |
| 2 | 2 | 1.0 | yes |
| 10 | 7 | 4.0 | yes |

In some embodiments, another example of score employing 710 includes adjusting 724 a filtering criterion 308 in response to results (supply 716 or withhold 722) of one or more scores 306. Similar results can be accomplished in some embodiments by adjusting 724 the trust score of the suggestion. In particular, some embodiments support untrusting a suggestion, that is, treating a suggestion as less trustworthy than before. In one scenario, additional developer review in the form of ratings leads to a lower rating for a suggestion and hence the suggestion's trust score goes down. In another scenario, further change in the codebase leads to less codebase utilization of the suggestion and hence the suggestion's trust score goes down. In a third scenario, the suggestion is rarely taken 434 and hence the suggestion's trust score goes down.

Accordingly, in some embodiments at a first point in time the provenance-derived trust score 306 meets a criterion for supplying 716 the ACSDS to a suggestion presentation interface 212 of the software development tool, and a method that is performed by or as the embodiment includes obtaining 702 additional provenance metadata at a second point in time after the first point in time, adjusting 724 the assigned provenance-derived trust score or the criterion based at least in part on the additional provenance metadata, and then determining that the (modified) provenance-derived trust score does not meet the (modified) criterion for supplying the ACSDS to the suggestion presentation interface. This may occur, in particular, during software development by a team 214.

In some embodiments, employing 710 the provenance-derived trust score includes at least one of the following: computationally determining 712 that the provenance-derived trust score meets a criterion for supplying the ACSDS to a suggestion presentation interface of the software development tool, and supplying 716 the ACSDS to the suggestion presentation interface; computationally determining 718 that the provenance-derived trust score meets a criterion for withholding the ACSDS from a suggestion presentation interface of the software development tool, and withholding 722 the ACSDS from the suggestion presentation interface; or computationally adjusting 724 a criterion for supplying the ACSDS to a suggestion presentation interface of the software development tool, based at least in part on the provenance-derived trust score and on data indicating whether the ACSDS was adopted after it was supplied. "Computationally" herein means using computing hardware, as opposed to being performed in a human mind.

Some embodiments provide users with the option of showing some provenance info 508 when displaying a suggestion 208, or at least showing a link 510 to some provenance info. In some, a method includes displaying 728 the ACSDS 208 in a screen view in the software development tool 204, and doing at least one of the following in the same screen view: displaying 846 one or more of the provenance values 508, or showing 848 a navigational item which upon being followed 826 displays 846 one or more of the provenance values. Some display 834 source code 210 for which the suggestion was previously endorsed.

One of skill informed by the teachings disclosed herein will acknowledge that an embodiment can provide technical benefits in several situations, e.g., by promoting consistent and prompt adoption of suggestions 208 which have been endorsed by other development team members. Some potential benefits in a given situation may include fixing security bugs, decreasing API antipattern usage, updating code in view of a breaking change in a library, making the same fix in many places, or making the same change across multiple codebases or multiple repositories, for example, while avoiding the introduction of widespread inconsistencies through use of various non-endorsed suggestions in response to a repeated code 210 pattern.

Accordingly, some embodiments are characterized in at least one of the following ways: an ACSDS 208, 602 targets 604 a security vulnerability 606 in a source code 210; an ACSDS 208, 608 targets 604 a use 614 of an application programming interface 610 antipattern 612; an ACSDS 208, 616 targets 604 a source code 210 that was made noncompilable 618 by a breaking change 620 in a library 426 the source code relies on; an ACSDS 208, 616 targets 604 a source code 210 that was made noninterpretable 618 by a breaking change 620 in a 426 library the source code relies on; an ACSDS 208, 622 matches a source code pattern 624 which appears 408 at least ten times in at least one codebase 402; an ACSDS 208, 626 has been adopted 434 within multiple codebases 402; or an ACSDS 208, 628 has been adopted 434 within multiple repositories 318.

One of skill informed by the present disclosure will acknowledge that repo pull lists 404 can be treated in an embodiment as evidence of codebase utilization 408 of a suggestion being implemented by a change to the codebase. Repo pull lists 404 can also or instead be treated in an embodiment as evidence of developer review 414 of a suggestion that is implemented by a change to the codebase.

In some embodiments, ascertaining 704 the codebase utilization level 416 includes searching a list of accepted pull requests of a repository, and in some ascertaining 704 the codebase utilization level 416 includes searching a list of all pull requests of a repository.

In some embodiments, ascertaining 704 the developer review level 420 includes searching a list of accepted pull requests of a repository, and in some ascertaining 704 the developer review level 420 includes searching a list of all pull requests of a repository.

A repository is merely one example of a source code control system, and a pull request is one example of a communication with a source code control system. Accordingly, in some embodiments other events in communications with a source code control system 406 are treated as evidence while ascertaining 704 one or more provenance values 508.

Some embodiments track how often an autocreated suggestion 208 is implemented, and use that adoption data 436 as provenance metadata. Some embodiments ascertain 704 a suggestion adoption level 436 which indicates an extent to which the ACSDS 208 has been adopted 434 after being presented within the software development tool.

Some embodiments use a source code control system 406 to get 842 identity metadata 324, such as suggestion utilizer identity 418 or suggestion saver identity 422. It is understood that appropriate privacy controls will be enforced in implementations. However, additional privacy controls beyond those already in place will not necessarily be called for in team development scenarios in which team members already have proper access to identity information about other team members, e.g., the ability to see who submitted a given pull request.

Accordingly, some embodiments are characterized in at least one of the following ways: ascertaining 704 the codebase utilizer identity 418 includes querying 842 a source code control 406 interface, ascertaining 704 the suggestion saver identity 422 includes querying 842 a source code control 406 interface, ascertaining 704 the codebase utilizer identity 418 includes querying 842 a code repository 318 interface, or ascertaining 704 the suggestion saver identity 422 includes querying 842 a code repository 318 interface.

Configured Storage Media

Some embodiments include a configured computer-readable storage medium 112. Storage medium 112 may include disks (magnetic, optical, or otherwise), RAM, EEPROMS or other ROMs, and/or other configurable memory, including in particular computer-readable storage media (which are not mere propagated signals). The storage medium which is configured may be in particular a removable storage medium 114 such as a CD, DVD, or flash memory. A general-purpose memory, which may be removable or not, and may be volatile or not, can be configured into an embodiment using items such as suggestion presentation software 302, provenance metadata 324, trust scores 306, filter criteria 308, enhanced tools 204, user-defined settings 506, and autocreated suggestions 208, in the form of data 118 and instructions 116, read from a removable storage medium 114 and/or another source such as a network connection, to form a configured storage medium. The configured storage medium 112 is capable of causing a computer system 102 to perform technical process steps for filtering autocreated suggestions 208 based on development team member endorsements 502, 504, as disclosed herein. The Figures thus help illustrate configured storage media embodiments and process (a.k.a. method) embodiments, as well as system and process embodiments. In particular, any of the process steps illustrated in FIG. 7 or 8 or otherwise taught herein, may be used to help configure a storage medium to form a configured storage medium embodiment.

Some embodiments use or provide a computer-readable storage medium 112, 114 configured with data 118 and instructions 116 which upon execution by at least one processor 110 cause a computing system to perform a suggestion filtering method. This method includes: obtaining 702 provenance metadata 324 of an automatically created software development suggestion (ACSDS) 208, the provenance metadata including a codebase utilization level 416 which indicates an extent to which the ACSDS has been utilized within at least one codebase 402; assigning 708 a provenance-derived trust score 306 to the ACSDS based at least in part on the provenance metadata; comparing 802 the provenance-derived trust score to a criterion 308 for supplying the ACSDS to a suggestion presentation interface 212 of a software development tool 204; and supplying 716 the ACSDS to the suggestion presentation interface of a software development tool or withholding 722 the ACSDS from the suggestion presentation interface, in response to a result of the comparing.

Some embodiments display a context 430 in which the suggestion has been applied 434 before. This could be the original context in which the suggestion was first automatically created, or it could be a later application of the suggestion. In particular, in some embodiments the method includes displaying 834 a source code 210 context 430 in which the ACSDS 208 was previously created 836 or previously adopted 434 or both. Some embodiments display context 430 that includes a detected edit, together with a source (developer ID) of a suggestion adopted by a team member, and the filename of code that shows the adopted suggestion and the location of the adoption within that file.

In some scenarios, a suggestion 208 comes from edits made by one or more other developers than the develop to whom the suggestion is offered after filtering 206. In particular, in some embodiments the ACSDS 208 was created 836 based on source code edits made by a set of one or more developers, and wherein the method supplies 716 the ACSDS to the suggestion presentation interface 212 while the suggestion presentation interface is displayed 728 to another developer who is not in the first set.

Some embodiments have enhanced usability due to the trust score interpretation not being user-defined. That is, a low configurability burden 500 on users is a benefit of some embodiments. In particular, in some the criterion 308 for supplying the ACSDS to a suggestion presentation interface is not user-defined (i.e., it is not a user-defined setting 506).

Some embodiments use machine learning technology to learn where to set the trust score cutoff by tracking how often suggestions are implemented. In some, the method includes ascertaining 704 a suggestion adoption level 436 which indicates an extent to which the ACSDS has been adopted after being presented 728 within the software development tool, and adjusting 724 the criterion 308 for supplying the ACSDS to the suggestion presentation interface based at least in part on the suggestion adoption level.

Additional Examples and Observations

One of skill will recognize that not every part of this disclosure, or any particular details therein, are necessarily required to satisfy legal criteria such as enablement, written description, or best mode. Any apparent conflict with any other patent disclosure, even from the owner of the present innovations, has no role in interpreting the claims presented in this patent disclosure. With this understanding, which pertains to all parts of the present disclosure, some additional examples and observations are offered.

Some embodiments provide technical advantages through enhancement of software development tools to automatically and proactively determine provenance of a code suggestion 208 based, for example, on proof-of-use of the suggestion in a commit tracked by a repository or other source code control system.

One of skill will acknowledge that several software development tools generate suggestions 208 based on learnings from a development team's codebases and developer interactions with those codebases. The Visual Studio® IntelliCode™ feature set is producing many automatic insights for developers, for example (marks of Microsoft Corporation). However, this activity presents the problem of determining which automatically generated suggestions 208 the user can trust as being reliable. In some development scenarios there are established review processes, such as repository pull requests, which allow developers to peer review contributions to a codebase. However, such processes do not adequately review suggestions created by an automated system, at least not without adding more burden to the review process or adding user interface capabilities (and underlying logic) to allow explicit suggestion 208 review.

Some embodiments leverage review mechanisms (e.g., pull requests, continuous integration tools, static analysis tools) with additional functionality 206 to determine whether a suggestion 208 has been applied in at least one place in a codebase, before making that suggestion a verified rule for that repo or codebase. In this manner developers can know that any suggestion proffered by the system is trustworthy in that it has been through at least one review and has been accepted into the body of code. Alternatives could involve additional review processes, which could be burdensome for the developer or team. Alternatives could also prevent suggestions from being verified, which leads to fewer suggestions or less trust or both. By contrast, some embodiments presented herein fit comfortably into established team processes of review and development.

Some embodiments define a chain of trust fora team suggestion 208 (also referred to here as a "rule"). Users benefit from automatic verification that a suggestion 208 came from a source they can trust, in order avoid random or even malicious suggestions.

Some embodiments implement a verified individual trust approach to suggestion provenance, whereby a user can see who saved the suggestion and may use that identity to determine whether to also trust the suggestion. In some, this approach uses authenticated credentials and accordingly presumes proper login of the user submitting the saved suggestion. An embodiment may capture a record of the credentials associated to the team member X who did the editing that led to a suggestion being initially attached to the repository. When another user Y gets a suggestion 208 based on the edits made by X, that origin is explicitly called out to Y and the enhanced tool shows the recipient of the suggestion Y the identity of the suggestion saver X. For instance, the user interface 212 may display an attribution message along with the suggestion, e.g., "Based on edits done by X". The attribution message may include an email or other contact info for X. This approach provides a chain of trust: user Y can adopt this suggestion, treating it as trustworthy because it is derived from the work of a person X that Y trusts.

Some embodiments implement a verified codebase change trust approach to suggestion provenance, whereby a user can confirm that the suggestion is trustworthy because the changes it suggests are verifiably from code changes in a repo the user trusts and the user can see the repo's record of who made those changes. In this approach, instead of using the authenticated identity of the user who saved the suggestion to establish a verifiable chain of trust, an embodiment leverages the fact that users 104 generally already trust code that originates in the repo they are working on, and that users trust that repo to tell them who the code and associated rule 208 were from and when they were introduced. This is often a richer context than simply knowing who committed a code change per the rule 208.

It follows that if an embodiment can determine that a change suggested by a rule 208 has already been made in a repo 318, users can safely trust the rule 208, since they trusted that change when it came through from the repo. In broad terms, a user Y trusts a suggestion origin 438, therefore Y trusts commits in the origin, therefore Y trusts this particular rule 208 because it reflects a change introduced in a commit to the trusted origin.

Accordingly, in some embodiments, a rule 208 is associated with a given commit on origin 438, which gives same verifiability as a new or changed code file. For verifiability, the rule 208 will be associated with the commit that had the changes that caused the rule to be used 408 for the first time. When an embodiment saves rules, e.g., to perform an APPLY & COMMIT, the commit will have the rule's ACTION incorporated in it in order to become verified (i.e., trusted per functionality 206). That is, the action the rule recommends would have been taken in the repo for the rule to become a verified rule. After a rule is verified, it may be supplied 716 for additional potential usage and be displayed with, e.g., the name of the person(s) who made the commit(s) that used the rule (per metadata 320 from the repo 318 or source code control system 406) and the date and time that code edits were made (also from the repo 318 or SCCS 406).

Some embodiments implement a verified binary change trust approach to suggestion provenance, especially in scenarios where a user acquires a binary package (e.g., a library or a NuGet package), whereby the user can verify that the suggestion is part of that shipped binary version distributed by the library author. Suggestions may be provided to help the library's consumers adapt to breaking changes when moving from one library version to another.

Technical Character

The technical character of embodiments described herein will be apparent to one of ordinary skill in the art, and will also be apparent in several ways to a wide range of attentive readers. Some embodiments address technical activities such as computationally determining the origins and utilizations of automatically created rules 208, computing trust scores 306 based on rule provenance 326, and determining 712 within special-purpose software 302 whether to supply 716 particular data associated with a suggestion 208 to a development tool user interface 212 or instead withhold 722 that data from being displayed, each of which is an activity deeply rooted in computing technology. Some of the technical mechanisms discussed include, e.g., suggestion filtering code 304, provenance-derived trust scoring 306, suggestion synthesizers 432, source code control systems 406, navigational items 510, and development tool user interfaces 212. Some of the technical effects discussed include, e.g., supplying 716 for display autocreated suggestions 208 or withholding 722 them from display according to whether the suggestions 208 have been previously endorsed by software development actions of other members of a development team 214, affiliation 424 of one or more suggestions 208 with a library 426 release, and reduced or avoided configuration burdens 500 on developers in connection with auto-created suggestions 208. Thus, purely mental processes are clearly excluded. Other advantages based on the technical characteristics of the teachings will also be apparent to one of skill from the description provided.

Some embodiments described herein may be viewed by some people in a broader context. For instance, concepts such as confidence, convenience, history, identity, origin, usage, or trust may be deemed relevant to a particular embodiment. However, it does not follow from the availability of a broad context that exclusive rights are being sought herein for abstract ideas; they are not. Rather, the present disclosure is focused on providing appropriately specific embodiments whose technical effects fully or partially solve particular technical problems, such as how to facilitate consistent utilization 408 of autocreated suggestions 208 while reducing exposure to malicious efforts to modify source code 210 and also reducing or avoiding rule 208 configuration burdens 500 on developers. Other configured storage media, systems, and processes involving confidence, convenience, history, identity, origin, usage, or trust are outside the present scope. Accordingly, vagueness, mere abstractness, lack of technical character, and accompanying proof problems are also avoided under a proper understanding of the present disclosure.

Additional Combinations and Variations

Any of these combinations of code, data structures, logic, components, communications, and/or their functional equivalents may also be combined with any of the systems and their variations described above. A process may include any steps described herein in any subset or combination or sequence which is operable. Each variant may occur alone, or in combination with any one or more of the other variants. Each variant may occur with any of the processes and each process may be combined with any one or more of the other processes. Each process or combination of processes, including variants, may be combined with any of the configured storage medium combinations and variants described above.

More generally, one of skill will recognize that not every part of this disclosure, or any particular details therein, are necessarily required to satisfy legal criteria such as enablement, written description, or best mode. Also, embodiments are not limited to the particular motivating examples and scenarios, operating system environments, suggestion creation mechanisms, software processes, development tools, identifiers, machine learning technologies, source code control systems, programming languages, data structures, data formats, notations, control flows, naming conventions, or other implementation choices described herein. Any apparent conflict with any other patent disclosure, even from the owner of the present innovations, has no role in interpreting the claims presented in this patent disclosure.

Acronyms, Abbreviations, Names, and Symbols

Some acronyms, abbreviations, names, and symbols are defined below. Others are defined elsewhere herein, or do not require definition here in order to be understood by one of skill.

ACSDS: automatically created software development suggestion
ALU: arithmetic and logic unit
API: application program interface
BIOS: basic input/output system
CD: compact disc
CPU: central processing unit
DVD: digital versatile disk or digital video disc
FPGA: field-programmable gate array
FPU: floating point processing unit
GPU: graphical processing unit
GUI: graphical user interface
IaaS or IAAS: infrastructure-as-a-service
ID: identification or identity
IoT: Internet of Things
IP: internet protocol
LAN: local area network
OS: operating system
PaaS or PAAS: platform-as-a-service
PR: pull request
RAM: random access memory
ROM: read only memory
SCCS: source code control system
TCP: transmission control protocol
TPU: tensor processing unit
UDP: user datagram protocol
UEFI: Unified Extensible Firmware Interface
URI: uniform resource identifier
URL: uniform resource locator
WAN: wide area network Some Additional Terminology Reference is made herein to exemplary embodiments such as those illustrated in the drawings, and specific language is used herein to describe the same. But alterations and further modifications of the features illustrated herein, and additional technical applications of the abstract principles illustrated by particular embodiments herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage (particularly in non-technical usage), or in the usage of a particular industry, or in a particular dictionary or set of dictionaries. Reference numerals may be used with various phrasings, to help show the breadth of a term. Omission of a reference numeral from a given piece of text does not necessarily mean that the content of a Figure is not being discussed by the text. The inventors assert and exercise the right to specific and chosen lexicography. Quoted terms are being defined explicitly, but a term may also be defined implicitly without using quotation marks. Terms may be defined, either explicitly or implicitly, here in the Detailed Description and/or elsewhere in the application file.

As used herein, a "computer system" (a.k.a. "computing system") may include, for example, one or more servers, motherboards, processing nodes, laptops, tablets, personal computers (portable or not), personal digital assistants, smartphones, smartwatches, smartbands, cell or mobile phones, other mobile devices having at least a processor and a memory, video game systems, augmented reality systems, holographic projection systems, televisions, wearable computing systems, and/or other device(s) providing one or more processors controlled at least in part by instructions. The instructions may be in the form of firmware or other software in memory and/or specialized circuitry.

A "multithreaded" computer system is a computer system which supports multiple execution threads. The term "thread" should be understood to include code capable of or subject to scheduling, and possibly to synchronization. A thread may also be known outside this disclosure by another name, such as "task," "process," or "coroutine," for example. However, a distinction is made herein between threads and processes, in that a thread defines an execution path inside a process. Also, threads of a process share a given address space, whereas different processes have different respective address spaces. The threads of a process may run in parallel, in sequence, or in a combination of parallel execution and sequential execution (e.g., time-sliced).

A "processor" is a thread-processing unit, such as a core in a simultaneous multithreading implementation. A processor includes hardware. A given chip may hold one or more processors. Processors may be general purpose, or they may be tailored for specific uses such as vector processing, graphics processing, signal processing, floating-point arithmetic processing, encryption, I/O processing, machine learning, and so on.

"Kernels" include operating systems, hypervisors, virtual machines, BIOS or UEFI code, and similar hardware interface software.

"Code" means processor instructions, data (which includes constants, variables, and data structures), or both instructions and data. "Code" and "software" are used interchangeably herein. Executable code, interpreted code, and firmware are some examples of code.

A "codebase" is code pertaining to a single project or a single web program or a single product. A "repository" is a computational mechanism for version-controlled storage of software including source code. A codebase may reside in a repository or may reside elsewhere, e.g., in a storage that is not currently version controlled. A repository may contain one or more codebases.

"Program" is used broadly herein, to include applications, kernels, drivers, interrupt handlers, firmware, state machines, libraries, and other code written by programmers (who are also referred to as developers), or automatically generated or automatically synthesized.

A "routine" is a callable piece of code which normally returns control to an instruction just after the point in a program execution at which the routine was called. Depending on the terminology used, a distinction is sometimes made elsewhere between a "function" and a "procedure": a function normally returns a value, while a procedure does not. As used herein, "routine" includes both functions and procedures. A routine may have code that returns a value (e.g., sin(x)) or it may simply return without also providing a value (e.g., void functions).

"Service" means a consumable program offering, in a cloud computing environment or other network or computing system environment, which provides resources to multiple programs or provides resource access to multiple programs, or does both.

"Autocompletion" refers to a code editing activity driven by suggestions offered by an editing tool, or to a result of such activity, and to a feature or other portion of software which performs autocompletion activity. Autocompletion may include, e.g., an editing functionality which uses part or all of a typed identifier to compute and display a list of suggestions for completing the identifier, or which uses a code fragment having a detected pattern to compute and display a list of suggestions for editing that code fragment.

"Cloud" means pooled resources for computing, storage, and networking which are elastically available for measured on-demand service. A cloud may be private, public, community, or a hybrid, and cloud services may be offered in the form of infrastructure as a service (IaaS), platform as a service (PaaS), software as a service (SaaS), or another service. Unless stated otherwise, any discussion of reading from a file or writing to a file includes reading/writing a local file or reading/writing over a network, which may be a cloud network or other network, or doing both (local and networked read/write).

"IoT" or "Internet of Things" means any networked collection of addressable embedded computing or data generation or actuator nodes. Such nodes may be examples of computer systems as defined herein, and may include or be referred to as a "smart" device, "endpoint", "chip", "label", or "tag", for example, and IoT may be referred to as a "cyber-physical system". IoT nodes and systems typically have at least two of the following characteristics: (a) no local human-readable display; (b) no local keyboard; (c) a primary source of input is sensors that track sources of non-linguistic data to be uploaded from the IoT device; (d) no local rotational disk storage—RAM chips or ROM chips provide the only local memory; (e) no CD or DVD drive; (f) embedment in a household appliance or household fixture; (g) embedment in an implanted or wearable medical device; (h) embedment in a vehicle; (i) embedment in a process automation control system; or (j) a design focused on one of the following: environmental monitoring, civic infrastructure monitoring, agriculture, industrial equipment monitoring, energy usage monitoring, human or animal health or fitness monitoring, physical security, physical transportation system monitoring, object tracking, inventory control, supply chain control, fleet management, or manufacturing. IoT communications may use protocols such as TCP/IP, Constrained Application Protocol (CoAP), Message Queuing Telemetry Transport (MQTT), Advanced Message Queuing Protocol (AMQP), HTTP, HTTPS, Transport Layer Security (TLS), UDP, or Simple Object Access Protocol (SOAP), for example, for wired or wireless (cellular or otherwise) communication. IoT storage or actuators or data output or control may be a target of unauthorized access, either via a cloud, via another network, or via direct local access attempts.

"Access" to a computational resource includes use of a permission or other capability to read, modify, write, execute, or otherwise utilize the resource. Attempted access may be explicitly distinguished from actual access, but "access" without the "attempted" qualifier includes both attempted access and access actually performed or provided.

"Software development workflow" means steps or actions taken by or on behalf of a software developer during software code creation or modification or testing or debugging or profiling or deployment or monitoring.

A "source code" is code in human-readable text form in a programming language, with the understanding that code includes more than merely data values—code includes statements, expressions, identifiers, variable declarations, functions, etc.

The "execution" of a code implies compiling the code and running the compiled code, or interpreting the code; the distinction between compilers and interpreters is acknowledged herein but does not prevent beneficial application of the teachings herein with either category of code.

As used herein, "include" allows additional elements (i.e., includes means comprises) unless otherwise stated.

"Optimize" means to improve, not necessarily to perfect. For example, it may be possible to make further improvements in a program or an algorithm which has been optimized.

"Process" is sometimes used herein as a term of the computing science arts, and in that technical sense encompasses computational resource users, which may also include or be referred to as coroutines, threads, tasks, interrupt handlers, application processes, kernel processes, procedures, or object methods, for example. As a practical matter, a "process" is the computational entity identified by system utilities such as Windows® Task Manager, Linux® ps, or similar utilities in other operating system environments (marks of Microsoft Corporation, Linus Torvalds, respectively). "Process" is also used herein as a patent law term of art, e.g., in describing a process claim as opposed to a system claim or an article of manufacture (configured storage medium) claim. Similarly, "method" is used herein at times as a technical term in the computing science arts (a kind of "routine") and also as a patent law term of art (a "process"). "Process" and "method" in the patent law sense are used interchangeably herein. Those of skill will understand which meaning is intended in a particular instance, and will also understand that a given claimed process or method (in the patent law sense) may sometimes be implemented using one or more processes or methods (in the computing science sense).

"Automatically" means by use of automation (e.g., general purpose computing hardware configured by software for specific operations and technical effects discussed herein), as opposed to without automation. In particular, steps performed "automatically" are not performed by hand on paper or in a person's mind, although they may be initiated by a human person or guided interactively by a human person. Automatic steps are performed with a machine in order to obtain one or more technical effects that would not be realized without the technical interactions thus provided. Steps performed automatically are presumed to include at least one operation performed proactively.

One of skill understands that technical effects are the presumptive purpose of a technical embodiment. The mere fact that calculation is involved in an embodiment, for example, and that some calculations can also be performed without technical components (e.g., by paper and pencil, or even as mental steps) does not remove the presence of the technical effects or alter the concrete and technical nature of the embodiment. Autocreated suggestion filtering 206 operations such as obtaining 702 provenance metadata 324 from a repository 318 or other source code control system 406 API 322 or log 320, ascertaining 704 a codebase utilization level 416, ascertaining 704 a rule 208 adoption level 436, computing 706 a provenance-derived trust score 306, determining 712 or 718 which filter criterion 308 is met, and many other operations discussed herein, are understood to be inherently digital. A human mind cannot interface directly with a CPU or other processor, or with RAM or other digital storage, or with a display 126, to read and write the necessary data to perform the suggestion filtering functionality 206 steps that are taught herein. This would all be well understood by persons of skill in the art in view of the present disclosure.

"Computationally" likewise means a computing device (processor plus memory, at least) is being used, and excludes obtaining a result by mere human thought or mere human action alone. For example, doing arithmetic with a paper and pencil is not doing arithmetic computationally as understood herein. Computational results are faster, broader, deeper, more accurate, more consistent, more comprehensive, and/or otherwise provide technical effects that are beyond the scope of human performance alone. "Computational steps" are steps performed computationally. Neither "automatically" nor "computationally" necessarily means "immediately". "Computationally" and "automatically" are used interchangeably herein.

"Proactively" means without a direct request from a user. Indeed, a user may not even realize that a proactive step by an embodiment was possible until a result of the step has been presented to the user. Except as otherwise stated, any computational and/or automatic step described herein may also be done proactively.

Throughout this document, use of the optional plural "(s)", "(es)", or "(ies)" means that one or more of the indicated features is present. For example, "processor(s)" means "one or more processors" or equivalently "at least one processor".

For the purposes of United States law and practice, use of the word "step" herein, in the claims or elsewhere, is not intended to invoke means-plus-function, step-plus-function, or 35 United State Code Section 112 Sixth Paragraph/Section 112(f) claim interpretation. Any presumption to that effect is hereby explicitly rebutted.

For the purposes of United States law and practice, the claims are not intended to invoke means-plus-function interpretation unless they use the phrase "means for". Claim language intended to be interpreted as means-plus-function language, if any, will expressly recite that intention by using the phrase "means for". When means-plus-function interpretation applies, whether by use of "means for" and/or by a court's legal construction of claim language, the means recited in the specification for a given noun or a given verb should be understood to be linked to the claim language and linked together herein by virtue of any of the following: appearance within the same block in a block diagram of the figures, denotation by the same or a similar name, denotation by the same reference numeral, a functional relationship depicted in any of the figures, a functional relationship noted in the present disclosure's text. For example, if a claim limitation recited a "zac widget" and that claim limitation became subject to means-plus-function interpretation, then at a minimum all structures identified anywhere in the specification in any figure block, paragraph, or example mentioning "zac widget", or tied together by any reference numeral assigned to a zac widget, or disclosed as having a functional relationship with the structure or operation of a zac widget, would be deemed part of the structures identified in the application for zac widgets and would help define the set of equivalents for zac widget structures.

One of skill will recognize that this innovation disclosure discusses various data values and data structures, and recognize that such items reside in a memory (RAM, disk, etc.), thereby configuring the memory. One of skill will also recognize that this innovation disclosure discusses various algorithmic steps which are to be embodied in executable code in a given implementation, and that such code also resides in memory, and that it effectively configures any general purpose processor which executes it, thereby transforming it from a general purpose processor to a special-purpose processor which is functionally special-purpose hardware.

Accordingly, one of skill would not make the mistake of treating as non-overlapping items (a) a memory recited in a claim, and (b) a data structure or data value or code recited in the claim. Data structures and data values and code are understood to reside in memory, even when a claim does not explicitly recite that residency for each and every data structure or data value or piece of code mentioned. Accordingly, explicit recitals of such residency are not required. However, they are also not prohibited, and one or two select recitals may be present for emphasis, without thereby excluding all the other data values and data structures and code from residency. Likewise, code functionality recited in a claim is understood to configure a processor, regardless of whether that configuring quality is explicitly recited in the claim.

Throughout this document, unless expressly stated otherwise any reference to a step in a process presumes that the step may be performed directly by a party of interest and/or performed indirectly by the party through intervening mechanisms and/or intervening entities, and still lie within the scope of the step. That is, direct performance of the step by the party of interest is not required unless direct performance is an expressly stated requirement. For example, a step involving action by a party of interest such as adjusting, affiliating, ascertaining, assigning, calculating, comparing, computing, conforming, creating, determining, discarding, displaying, employing, following, identifying, indicating, obtaining, operating, performing, presenting, saving, searching, selecting, supplying, withholding (and adjusts, adjusted, affiliates, affiliated, etc.) with regard to a destination or other subject may involve intervening action such as the foregoing or forwarding, copying, uploading, downloading, encoding, decoding, compressing, decompressing, encrypting, decrypting, authenticating, invoking, and so on by some other party, including any action recited in this document, yet still be understood as being performed directly by the party of interest.

Whenever reference is made to data or instructions, it is understood that these items configure a computer-readable memory and/or computer-readable storage medium, thereby transforming it to a particular article, as opposed to simply existing on paper, in a person's mind, or as a mere signal being propagated on a wire, for example. For the purposes of patent protection in the United States, a memory or other computer-readable storage medium is not a propagating signal or a carrier wave or mere energy outside the scope of patentable subject matter under United States Patent and Trademark Office (USPTO) interpretation of the In re Nuijten case. No claim covers a signal per se or mere energy in the United States, and any claim interpretation that asserts otherwise in view of the present disclosure is unreasonable on its face. Unless expressly stated otherwise in a claim granted outside the United States, a claim does not cover a signal per se or mere energy.

Moreover, notwithstanding anything apparently to the contrary elsewhere herein, a clear distinction is to be understood between (a) computer readable storage media and computer readable memory, on the one hand, and (b) transmission media, also referred to as signal media, on the other hand. A transmission medium is a propagating signal or a carrier wave computer readable medium. By contrast, computer readable storage media and computer readable memory are not propagating signal or carrier wave computer readable media. Unless expressly stated otherwise in the claim, "computer readable medium" means a computer readable storage medium, not a propagating signal per se and not mere energy.

An "embodiment" herein is an example. The term "embodiment" is not interchangeable with "the invention". Embodiments may freely share or borrow aspects to create other embodiments (provided the result is operable), even if a resulting combination of aspects is not explicitly described per se herein. Requiring each and every permitted combination to be explicitly and individually described is unnecessary for one of skill in the art, and would be contrary to policies which recognize that patent specifications are written for readers who are skilled in the art. Formal combinatorial calculations and informal common intuition regarding the number of possible combinations arising from even a small number of combinable features will also indicate that a large number of aspect combinations exist for the aspects described herein. Accordingly, requiring an explicit recitation of each and every combination would be contrary to policies calling for patent specifications to be concise and for readers to be knowledgeable in the technical fields concerned.

LIST OF REFERENCE NUMERALS

The following list is provided for convenience and in support of the drawing figures and as part of the text of the specification, which describe innovations by reference to multiple items. Items not listed here may nonetheless be part of a given embodiment. For better legibility of the text, a given reference number is recited near some, but not all, recitations of the referenced item in the text. The same reference number may be used with reference to different examples or different instances of a given item. The list of reference numerals is:

100 operating environment, also referred to as computing environment 102 computer system, also referred to as a "computational system" or "computing system", and when in a network may be referred to as a "node"

104 users, e.g., a software developer or other user of an enhanced system 202

106 peripherals 108 network generally, including, e.g., clouds, local area networks (LANs), wide area networks (WANs), client-server networks, or networks which have at least one trust domain enforced by a domain controller, and other wired or wireless networks; these network categories may overlap, e.g., a LAN may have a domain controller and also operate as a client-server network 110 processor 112 computer-readable storage medium, e.g., RAM, hard disks 114 removable configured computer-readable storage medium 116 instructions executable with processor; may be on removable storage media or in other memory (volatile or non-volatile or both)

118 data 120 kernel(s), e.g., operating system(s), BIOS, UEFI, device drivers 122 tools, e.g., anti-virus software, firewalls, packet sniffer software, intrusion detection systems, intrusion prevention systems, other cybersecurity tools, debuggers, profilers, compilers, interpreters, decompilers, assemblers, disassemblers, source code editors, identifier autocompletion software, simulators, fuzzers, repository access tools, version control tools, optimizers, collaboration tools, other software development tools and tool suites (including, e.g., integrated development environments), hardware development tools and tool suites, diagnostics, enhanced browsers, and so on 124 applications, e.g., word processors, web browsers, spreadsheets, games, email tools, commands 126 display screens, also referred to as "displays"

128 computing hardware not otherwise associated with a reference number 106, 108, 110, 112, 114

202 enhanced computers, e.g., computers 102 (nodes 102) enhanced with autocreated suggestion 208 filtering functionality 204 software development tool with functionality for displaying, editing, or analyzing source code (or a combination thereof); some examples include IDEs, source code text editors, source code analyzers, repository tool chain tools, and continuous integration or continuous deployment tools 206 autocreated suggestion 208 filtering functionality, e.g., functionality which automatically does at least one of the following: determines provenance 326 of an autocreated suggestion 208, computes a trust score 306, compares a trust score to a filter criterion 308, adjusts a filter criterion 308, conforms with the FIG. 8 flowchart or its constituent flowchart 700, or otherwise provides capabilities first taught herein; reference numeral 206 also refers to any action of filtering that is performed with such functionality 208 autocreated suggestion, e.g., a code edit change or a suggested code fragment which was created automatically by machine learning or program synthesis technology; also referred to as a "rule", as an "ACSDS", and by other phrases associated herein with reference numeral 208; "suggestion" without "autocreated" or reference numeral 208 refers to an autocreated suggestion unless a human-created suggestion is expressly indicated; rules 208 may be derived from repeated edits or other pattern matches, for example 210 source code; presumed to be in a programming language 212 user interface, e.g., GUI or command line interface; reference numeral 212 also refers to any portion of a user interface which presents autocreated suggestions or their context to a developer 214 team or other group of software developers 216 machine learning or program synthesis technology which creates suggestions 208

302 suggestion presentation software, e.g., autocompletion software or quick action software which offers suggestions to a developer in an editor tool; in a given scenario the suggestion presentation software may present both autocreated suggestions and human-created suggestions, or it may present only autocreated suggestions 304 filter code, e.g., code which upon execution performs one or more of steps 702, 704, 706, 708, 712, 718, 722, 724, or 828

306 provenance-derived trust score; assumed to be a computational result of filtering functionality operation, rather than being entered or set by a user; as a convention, having a higher trust score may mean an autocreated suggestion is more trustworthy and having a lower trust score would accordingly mean an autocreated suggestion is less trustworthy, but in some embodiments the meanings could be reversed, so higher scores corresponds to lower trustworthiness; the range of the trust score may be 1 to 100, zero to 100, 0.0 to 1.0, or any other convenient range in a given embodiment 308 autocreated suggestion filter criterion for computationally determining whether to supply or withhold display of an autocreated suggestion 310 source code editor, e.g., an editor in an IDE, or a stand-alone editor; reference numeral 310 also refers to the computational act of editing with such an editor 312 source code analyzer or source code review tool, e.g., static analysis tool, pull request review tool; reference numeral 312 also refers to the computational act of analyzing or reviewing code with such an analyzer 314 integrated development environment 316 repository mechanism, e.g., API or other interface to a repository 318 repository; also referred to as a "code repository" or "repo"

320 data created by or stored within a repository, and data derived from such data 322 interface between items in a computing system; interfaces include both hardware and software unless stated otherwise 324 provenance metadata; a particular kind of data 118 (one or more values) which is used as taught herein for determining provenance of an autocreated suggestion 326 provenance of an autocreated suggestion 402 codebase, e.g., code of a particular application, particular project, particular software bundle, particular product family, or particular vendor 404 repository pull request; 404 refers to the computational activity of instructing a repo to perform a pull request, or digital data communications with a repo in conjunction with such activity, or both; 404 does not refer to human action per se 406 source code control system; refers to a system 102 configured with computational functionality for version control of source code, or to a source code control subsystem of a system 102

408 utilization of an autocreated suggestion in a codebase; may be inferred computationally from data in the codebase indicating that the change proposed by the autocreated suggestion was implemented in the codebase (that is, it was adopted); 408 may refer to a particular utilization, or to utilization overall 410 implementation of a change, e.g., code per a suggestion 412 a change in code which is made or capable of being made by adopting an autocreated suggestion 414 review of a code change or suggestion 208 by a developer 416 level of utilization of an autocreated suggestion in a codebase by one or more developers 418 identity (e.g., username, real world name, or email address or other contact info) of a developer who utilized an autocreated suggestion 420 level of review of code a code change or suggestion 208 by one or more developers 422 identity (e.g., username, real world name, or email address or other contact info) of a developer who saved an autocreated suggestion as opposed to discarding it 424 affiliation of an autocreated suggestion with a library; assumed to be implemented via a data structure as opposed to being in the form of a conversation or other human-to-human communication 426 library or package, in the sense of software 428 affiliation of an autocreated suggestion with a repository; assumed to be implemented via a data structure as opposed to being in the form of a conversation or other human-to-human communication 430 context illustrating possible or actual adoption of an autocreated suggestion, e.g., the suggestion as presented for possible adoption, the source code which was being displayed when the suggestion was presented, date and time of presentation, identity of the developer to whom the suggestion was presented, action taken (adopted or not), and so on 432 program synthesizer; refers to technology not to a human 434 adopt an autocreated suggestion, e.g., by making a change in code as the suggestion suggested, or in some embodiments by saving the suggestion rather than discarding it 436 level of adoption of an autocreated suggestion, e.g., statistics on number of times it was displayed and number of those times it was adopted 438 origin of an autocreated suggestion, e.g., a program synthesizer 500 configuration burden, e.g., one or more settings or other choices to be made by a human to configure software for operation; a technical benefit of some embodiments is that the filtering functionality 206 reduces configuration burden by decluttering a suggestions space for the end user 502 implicit endorsement, e.g., a first subsequent submission to a repo or other source code control system of source code which has been edited per an autocreated suggestion is an implicit endorsement of that suggestion 504 explicit endorsement, e.g., adopting an autocreated suggestion and thereby editing source code per the suggestion is an explicit endorsement of that suggestion; saving an autocreated suggestion when given the choice of either saving it or discarding it is also an explicit endorsement of the suggestion 506 settings (configuration values) which are set by a user, or which are at least visible to the user and could be changed or expressly confirmed by the user; some user-defined settings have default values which they retain unless the user changes them to other values 508 provenance values; refers to provenance metadata values themselves or to values derived from or based on one or more provenance metadata values for comparison with a filter criterion 308

510 navigational item in a user interface, e.g., link, button, tab, menu 512 weighted combination of provenance values, e.g., an arithmetic expression combining provenance values; weights may be defined as constants or variables or function call results, for example; weighting may be done by multiplying provenance values by weights, for example; combining may be by addition or other arithmetic operation, for example 514 trust score cutoff; may also be referred to as a trust score "threshold"; an inequality relationship with a trust score cutoff is an example of a filter criterion, e.g., "less than 0.8"

602 indicates that an autocreated suggestion targets a security vulnerability, in that adopting the change proposed by the suggestion will reduce or remove the vulnerability 604 target of an autocreated suggestion, e.g., a flaw or deficiency or other undesirable aspect of code which will be mitigated or avoided by adopting the suggestion 606 security vulnerability in code, e.g., a vulnerability identified by the Open Web Application Security Project, International Information System Security Certification Consortium, United States National Institute of Standards and Technology, or Computing Technology Industry Association 608 indicates that an autocreated suggestion targets an instance of an API antipattern, in that adopting the change proposed by the suggestion will reduce or remove the antipattern 610 application program interface (API); also refers to software interfaces generally 612 antipattern, e.g., a pattern in code which makes the code less effective or less productive than avoiding the pattern would be 614 instance of an antipattern in source code 616 indicates that an autocreated suggestion targets source that is broken by an updated library, in that adopting the change proposed by the suggestion will fix the break so the code will work with the updated library 618 refers to code being broken, e.g., no longer compilable, as a result of a change in a library the code uses; one of many examples is that in many cases changing the number of parameters in a library function will break code that invokes that function 620 a change in a library that impacts availability of the library's functionality to code that uses the previous version of the library, e.g., changing the number of parameters in a library function, changing the name of a library function or global variable or API or exported data structure, removing a library function or global variable or API or exported data structure, and so on 622 indicates that an autocreated suggestion targets an instance of a source code pattern, in that adopting the change proposed by the suggestion will enhance consistent use of an alternative to the pattern 624 source code pattern 626 indicates that an autocreated suggestion has been adopted in multiple codebases 628 indicates that an autocreated suggestion has been adopted in multiple repositories 700 flowchart; 700 also refers to software development tool methods illustrated by or consistent with the FIG. 7 flowchart 702 obtain autocreated suggestion provenance metadata; performed computationally, e.g., by API invocation, network transmission, log scanning 704 ascertain provenance values; performed computationally, e.g., by using provenance metadata obtained 702 into working memory, or performing arithmetic operations on such metadata 706 compute provenance-derived trust score; performed computationally, e.g., by machine learning or statistical operations 708 assign provenance-derived trust score to an autocreated suggestion; performed computationally, e.g., by setting a value in a data structure 710 employ a trust score 306 within a software development tool; performed computationally, e.g., by one or more of the steps shown inside box 710 of FIG. 7

712 determine whether a trust score 306 of an autocreated suggestion meets a criterion 308 for supplying the autocreated suggestion to a user interface; performed computationally 714 meet (satisfy) a criterion 308 for supplying an autocreated suggestion to a user interface for presentation to a developer 716 supply an autocreated suggestion to a user interface for presentation to a developer; performed computationally, e.g., by passing a parameter or a pointer 718 determine whether a trust score 306 of an autocreated suggestion meets a criterion 308 for withholding the autocreated suggestion from a user interface; performed computationally; determining that the supplying criterion is not met may be considered the same in some embodiments as determining that the withholding criterion is met, and vice versa 720 meet (satisfy) a criterion 308 for withholding an autocreated suggestion from a user interface, thus withholding the suggestion from presentation to a developer (at least this time)

722 withhold an autocreated suggestion from a user interface, thus withholding the suggestion from visual or aural presentation to a developer; performed computationally, e.g., by skipping an instruction 116 that passes a parameter or a pointer in situation where not skipping it would supply an autocreated suggestion to the user interface for presentation 724 adjust value (or test and confirm adequacy of current value) of a suggestion 208 filtering criterion 308; performed computationally 726 digital data regarding adoption 434 of an autocreated suggestion within a codebase or within a repository or by a development team 728 conform a display screen 126; may also be referred to as an embodiment "displaying", "presenting", or "showing" data to a developer 800 flowchart; 800 also refers to software development tool methods illustrated by or consistent with the FIG. 8 flowchart (which incorporates the steps of FIG. 7)

802 computationally compare trust score to filter criterion 804 computationally present suggestions per their endorsements such that automatically created suggestions are presented 728 to software developers more often or less often depending on whether other software developers have or have not at least implicitly endorsed the automatically created suggestions 806 computationally indicate software developer endorsement of an autocreated suggestion, e.g., by showing who endorsed the suggestion, or a count of endorsements, or by showing which repo or codebase the suggestion has been adopted within or which library is suggestion is affiliated 424 with 808 computationally operate within an editor or other tool, e.g., as a portion of that tool's executable code or as executable code invoked by the tool 810 computationally select a value from exactly two values 812 computationally select a value from at least three values 814 computationally operate without additional user-defined settings beyond any provided to configure features other than suggestion 208 filtering 816 computationally operate without user-defined settings that are unique to suggestion 208 filtering; applicability of 814 aspect and 816 aspect may differ in that a user-defined setting may pertain to all suggestions (autocreated and human-created) or a user-defined setting may pertain only to autocreated suggestions 818 computationally operate subject to a user-defined setting 820 computationally save an autocreated suggestion for later employment 710

822 computationally discard an autocreated suggestion instead of saving it for later employment 710

824 computationally affiliate an autocreated suggestion with a library or package or other software update; may be performed, e.g., by setting a link or other suggestion ID in an update data structure, or by setting an update ID in a suggestion data structure, or both 826 computationally follow a navigation link in a user interface 828 calculate (with a processor 110) a weighted combination 512

830 computationally search a list of pull requests or a list of accepted pull requests (per specified context)

832 a list of pull requests or a list of accepted pull requests (per specified context); a "list" may be a linked list, table, array, or other data structure, and is not necessarily sorted 834 display (on a computing device) source code or other context which illustrates provenance of an autocreated suggestion 836 create (a.k.a. synthesize or generate) an autocreated suggestion; performed by a computing system 838 indicate utilization of an autocreated suggestion, e.g., by displaying a computed utilization level or by setting a computed utilization level in memory 840 indicate affiliation of an autocreated suggestion, e.g., by displaying an affiliated item ID or by setting an affiliated item ID in memory 842 identify a developer or a set of developers, e.g., by setting one or more IDs 418, 422 in memory 844 any step discussed in the present disclosure that has not been assigned some other reference numeral 848 display a navigation link in a user interface

CONCLUSION

In short, the teachings herein provide a variety of autocreated suggestion filtering functionalities 206 which operate in enhanced systems 202. Accuracy and productivity of software development is enhanced, with particular attention to situations such as editing source code 210 as a development team 214 member using tools 204 which provide autocompletion or quick actions. However, the teachings are not limited to those situations.

Some embodiments determine automatically which synthesized or otherwise autocreated suggestions 208 for source code 210 editing are presented 728 to developers. Some embodiments filter out 722 autocreated coding suggestions 208 that have not been sufficiently endorsed 502 or 504 or both by a developer's team 214, based on a suggestion trust score 306 and filter criterion 308. The trust score 306 may reflect the suggestion's adoption 434 in a particular repository 318 or codebase 402, or affiliation 424 of the suggestion 208 with a library 426 release, or an actual 504 or implied 502 review 414 of the suggestion 208 by team 214 members 104. Some suggestion filters 304 enhance existing development team code review practices, by offering endorsed suggestions 208 in autocompletion or analysis interfaces 212 of tools 204 and by withholding 722 non-endorsed suggestions from display. Context 430 illustrating the autocreated suggestion's provenance 326 may be displayed 834 to help developers decide whether to adopt the suggestion 208 themselves while editing code 210. Some tools 204 that are enhanced with suggestion 208 filtering functionality 206 avoid developer configuration burdens 500 while increasing consistent adoption 434 of endorsed suggestions 208 inside a codebase 402.

Embodiments are understood to also themselves include or benefit from tested and appropriate security controls and privacy controls such as the General Data Protection Regulation (GDPR). Use of the tools and techniques taught herein is compatible with use of such controls.

Although Microsoft technology is used in some motivating examples, the teachings herein are not limited to use in technology supplied or administered by Microsoft. Under a suitable license, for example, the present teachings could be embodied in software or services provided by other cloud service providers.

Although particular embodiments are expressly illustrated and described herein as processes, as configured storage media, or as systems, it will be appreciated that discussion of one type of embodiment also generally extends to other embodiment types. For instance, the descriptions of processes in connection with FIGS. 7 and 8 also help describe configured storage media, and help describe the technical effects and operation of systems and manufactures like those discussed in connection with other Figures. It does not follow that limitations from one embodiment are necessarily read into another. In particular, processes are not necessarily limited to the data structures and arrangements presented while discussing systems or manufactures such as configured memories.

Those of skill will understand that implementation details may pertain to specific code, such as specific thresholds or ranges, specific architectures, specific attributes, and specific computing environments, and thus need not appear in every embodiment. Those of skill will also understand that program identifiers and some other terminology used in discussing details are implementation-specific and thus need not pertain to every embodiment. Nonetheless, although they are not necessarily required to be present here, such details may help some readers by providing context and/or may illustrate a few of the many possible implementations of the technology discussed herein.

With due attention to the items provided herein, including technical processes, technical effects, technical mechanisms, and technical details which are illustrative but not comprehensive of all claimed or claimable embodiments, one of skill will understand that the present disclosure and the embodiments described herein are not directed to subject matter outside the technical arts, or to any idea of itself such as a principal or original cause or motive, or to a mere result per se, or to a mental process or mental steps, or to a business method or prevalent economic practice, or to a mere method of organizing human activities, or to a law of nature per se, or to a naturally occurring thing or process, or to a living thing or part of a living thing, or to a mathematical formula per se, or to isolated software per se, or to a merely conventional computer, or to anything wholly imperceptible or any abstract idea per se, or to insignificant post-solution activities, or to any method implemented entirely on an unspecified apparatus, or to any method that fails to produce results that are useful and concrete, or to any preemption of all fields of usage, or to any other subject matter which is ineligible for patent protection under the laws of the jurisdiction in which such protection is sought or is being licensed or enforced.

Reference herein to an embodiment having some feature X and reference elsewhere herein to an embodiment having some feature Y does not exclude from this disclosure embodiments which have both feature X and feature Y, unless such exclusion is expressly stated herein. All possible negative claim limitations are within the scope of this disclosure, in the sense that any feature which is stated to be part of an embodiment may also be expressly removed from inclusion in another embodiment, even if that specific exclusion is not given in any example herein. The term "embodiment" is merely used herein as a more convenient form of "process, system, article of manufacture, configured computer readable storage medium, and/or other example of the teachings herein as applied in a manner consistent with applicable law." Accordingly, a given "embodiment" may include any combination of features disclosed herein, provided the embodiment is consistent with at least one claim.

Not every item shown in the Figures need be present in every embodiment. Conversely, an embodiment may contain item(s) not shown expressly in the Figures. Although some possibilities are illustrated here in text and drawings by specific examples, embodiments may depart from these examples. For instance, specific technical effects or technical features of an example may be omitted, renamed, grouped differently, repeated, instantiated in hardware and/or software differently, or be a mix of effects or features appearing in two or more of the examples. Functionality shown at one location may also be provided at a different location in some embodiments; one of skill recognizes that functionality modules can be defined in various ways in a given implementation without necessarily omitting desired technical effects from the collection of interacting modules viewed as a whole. Distinct steps may be shown together in a single box in the Figures, due to space limitations or for convenience, but nonetheless be separately performable, e.g., one may be performed without the other in a given performance of a method.

Reference has been made to the figures throughout by reference numerals. Any apparent inconsistencies in the phrasing associated with a given reference numeral, in the figures or in the text, should be understood as simply broadening the scope of what is referenced by that numeral. Different instances of a given reference numeral may refer to different embodiments, even though the same reference numeral is used. Similarly, a given reference numeral may be used to refer to a verb, a noun, and/or to corresponding instances of each, e.g., a processor 110 may process 110 instructions by executing them.

As used herein, terms such as "a", "an", and "the" are inclusive of one or more of the indicated item or step. In particular, in the claims a reference to an item generally means at least one such item is present and a reference to a step means at least one instance of the step is performed. Similarly, "is" and other singular verb forms should be understood to encompass the possibility of "are" and other plural forms, when context permits, to avoid grammatical errors or misunderstandings.

Headings are for convenience only; information on a given topic may be found outside the section whose heading indicates that topic.

All claims and the abstract, as filed, are part of the specification.

To the extent any term used herein implicates or otherwise refers to an industry standard, and to the extent that applicable law requires identification of a particular version of such as standard, this disclosure shall be understood to refer to the most recent version of that standard which has been published in at least draft form (final form takes precedence if more recent) as of the earliest priority date of the present disclosure under applicable patent law.

While exemplary embodiments have been shown in the drawings and described above, it will be apparent to those of ordinary skill in the art that numerous modifications can be made without departing from the principles and concepts set forth in the claims, and that such modifications need not encompass an entire abstract concept. Although the subject matter is described in language specific to structural features and/or procedural acts, it is to be understood that the subject matter defined in the appended claims is not necessarily limited to the specific technical features or acts described above the claims. It is not necessary for every means or aspect or technical effect identified in a given definition or example to be present or to be utilized in every embodiment. Rather, the specific features and acts and effects described are disclosed as examples for consideration when implementing the claims.

All changes which fall short of enveloping an entire abstract idea but come within the meaning and range of equivalency of the claims are to be embraced within their scope to the full extent permitted by law.

What is claimed is:

1. A software development system having a user interface for interaction with a first software developer editing or reviewing source code, the software development system comprising:

a digital memory; and a processor in operable communication with the digital memory, the processor configured to perform suggestion filtering steps which include automatically (a) obtaining provenance metadata of an automatically created software development suggestion (ACSDS), the provenance metadata of the ACSDS indicating implicit or explicit software developer endorsement of the ACSDS by at least one other software developer than the first software developer, (b) assigning a provenance-derived trust score to the ACSDS based at least in part on the provenance metadata of the ACSDS but not based on whether the ACSDS matches an application programming interface antipattern and not based on whether the ACSDS matches a source code pattern, (c) comparing the provenance-derived trust score to a criterion for supplying the ACSDS to a suggestion presentation interface of a software development tool or to a criterion for withholding the ACSDS from the suggestion presentation interface of the software development tool, and (d) supplying the ACSDS to the suggestion presentation interface of the software development tool or withholding the ACSDS from the suggestion presentation interface of the software development tool and from any other presentation by the software development system to any other software developer, in response to a result of the comparing;

whereby the software development system presents the ACSDS to the first software developer more often or less often depending on whether other software developers have or have not at least implicitly endorsed the ACSDS; and whereby the software development system adopts the implicitly endorsed ACSDS when the first software developer applies the implicitly endorsed ACSDS to modify the source code using the software development tool.

2. The software development system of claim 1, further characterized in at least one of the following ways:

the software development tool includes a source code editor, and the suggestion presentation interface of the software development tool operates within the source code editor;

the software development tool includes a source code review tool, and the suggestion presentation interface of the software development tool operates within the source code review tool; or the software development tool includes a source code analysis tool, and the suggestion presentation interface of the software development tool operates within the source code analysis tool.

3. The software development system of claim 1, wherein the provenance metadata of the ACSDS comprises at least one of the following:

a codebase utilization level which indicates an extent to which the ACSDS has been utilized within a codebase;

a codebase utilizer identity which identifies at least one software developer who submitted one or more suggestion-based changes to a codebase, each suggestion-based change of the one or more suggestion-based changes including a software implementation of the ACSDS;

a developer review level which indicates an extent to which the ACSDS has been reviewed by at least one software developer;

a suggestion saver identity which identifies at least one software developer who chose to save the ACSDS instead of discarding the ACSDS;

a library affiliation which indicates that the ACSDS is affiliated with a library by an authorized author of the library or an authorized distributor of the library; or a repository affiliation which indicates that the ACSDS is affiliated with a code repository by an authorized user of the code repository.

4. The software development system of claim 3, further characterized in at least one of the following ways:

the codebase utilization level is selected from a set consisting of two values;

the codebase utilization level is selected from a set which includes more than two values;

the developer review level is selected from a set consisting of two values; or the developer review level is selected from a set which includes more than two values.

5. The software development system of claim 1, further characterized in at least one of the following ways:

the suggestion presentation interface of the software development tool operates subject to one or more user-defined settings, and the suggestion filtering steps operate without any additional user-defined settings; or the suggestion filtering steps operate without any user-defined settings which are unique to the suggestion filtering steps.

6. A software development tool method performed by a computing system interacting with a first software developer to edit or review source code, comprising:

obtaining provenance metadata of an automatically created software development suggestion (ACSDS);

ascertaining at least one of the following provenance values at least in part by using the provenance metadata of the ACSDS:

a codebase utilization level which indicates an extent to which the ACSDS has been utilized within a codebase by at least one software developer other than the first software developer;

a codebase utilizer identity which identifies at least one software developer other than the first software developer who submitted one or more suggestion-based changes to a codebase, each suggestion-based change of the one or more suggestion-based changes including a software implementation of the ACSDS;

a developer review level which indicates an extent to which the ACSDS has been reviewed by at least one software developer other than the first software developer;

a suggestion saver identity which identifies at least one software developer other than the first software developer who chose to save the ACSDS instead of discarding the ACSDS;

a library affiliation which indicates that the ACSDS is affiliated with a library by an authorized author of the library or an authorized distributor of the library other than the first software developer; or a repository affiliation which indicates that the ACSDS is affiliated with a code repository by an authorized user of the code repository other than the first software developer;

computing a provenance-derived trust score for the ACSDS based at least in part on a result of the ascertaining but not based on whether the ACSDS matches an application programming interface antipattern and not based on whether the ACSDS matches a source code pattern;

assigning the provenance-derived trust score to the ACSDS;

employing the provenance-derived trust score within a software development tool;

displaying the ACSDS in a screen view of the software development tool; and adopting the ACSDS when the first software developer applies the ACSDS to modify the source code using the software development tool.

7. The software development tool method of claim 6, wherein, at a first point in time, the provenance-derived trust score meets a criterion for supplying the ACSDS to a suggestion presentation interface of the software development tool, and wherein the software development tool method further comprises:

obtaining additional provenance metadata of the ACSDS at a second point in time after the first point in time;

adjusting the provenance-derived trust score or the criterion for supplying the ACSDS to the suggestion presentation interface of the software development tool or both based at least in part on the additional provenance metadata of the ACSDS; and determining that the provenance-derived trust score does not meet the criterion for supplying the ACSDS to the suggestion presentation interface of the software development tool.

8. The software development tool method of claim 6, wherein employing the provenance-derived trust score within the software development tool comprises at least one of the following:

computationally determining that the provenance-derived trust score meets a criterion for supplying the ACSDS to a suggestion presentation interface of the software development tool, and supplying the ACSDS to the suggestion presentation interface of the software development tool;

computationally determining that the provenance-derived trust score meets a criterion for withholding the ACSDS from a suggestion presentation interface of the software development tool, and withholding the ACSDS from the suggestion presentation interface of the software development tool and from any other presentation to any other software developer; or computationally adjusting a criterion for supplying the ACSDS to a suggestion presentation interface of the software development tool, based at least in part on the provenance-derived trust score and on data indicating whether the ACSDS was adopted after the ACSDS was supplied to the suggestion presentation interface of the software development tool.

9. The software development tool method of claim 6, further comprising performing at least one of the following in the screen view of the software development tool:

displaying one or more of the provenance values; or showing a navigational item which upon being followed displays one or more of the provenance values.

10. The software development tool method of claim 6, further characterized in at least one of the following ways:

the ACSDS targets a security vulnerability in a source code;

the ACSDS targets a use of an application programming interface antipattern;

the ACSDS targets a source code that was made noncompilable by a breaking change in a library the source code relies on;

the ACSDS targets a source code that was made noninterpretable by a breaking change in a library the source code relies on;

the ACSDS matches a source code pattern which appears at least ten times in at least one codebase;

the ACSDS has been adopted within multiple codebases; or the ACSDS has been adopted within multiple repositories.

11. The software development tool method of claim 6, wherein computing the provenance-derived trust score comprises calculating a weighted combination of at least two of the provenance values.

12. The software development tool method of claim 6, further characterized in at least one of the following ways:

ascertaining the codebase utilization level comprises searching a list of accepted pull requests of a repository; or ascertaining the developer review level comprises searching a list of accepted pull requests of a repository.

13. The software development tool method of claim 6, wherein the provenance-derived trust score is computed based at least in part on the codebase utilization level or the repository affiliation or both.

14. The software development tool method of claim 6, further comprising ascertaining a suggestion adoption level which indicates an extent to which the ACSDS has been adopted after being presented within the software development tool.

15. The software development tool method of claim 6, further characterized in at least one of the following ways:

ascertaining the codebase utilizer identity comprises querying a source code control interface;

ascertaining the suggestion saver identity comprises querying a source code control interface;

ascertaining the codebase utilizer identity comprises querying a code repository interface; or ascertaining the suggestion saver identity comprises querying a code repository interface.

16. A computer-readable storage medium configured with data and instructions which upon execution by a processor cause a computing system to perform a suggestion filtering method interacting with a first software developer to edit or review source code, the suggestion filtering method comprising:

obtaining provenance metadata of an automatically created software development suggestion (ACSDS), the provenance metadata of the ACSDS including a codebase utilization level which indicates an extent to which the ACSDS has been utilized within at least one codebase by at least one software developer other than the first software developer;

assigning a provenance-derived trust score to the ACSDS based at least in part on the provenance metadata of the ACSDS but not based on whether the ACSDS matches an application programming interface antipattern and not based on whether the ACSDS matches a source code pattern;

comparing the provenance-derived trust score to a criterion for supplying the ACSDS to a suggestion presentation interface of a software development tool or to a criterion for withholding the ACSDS from the suggestion presentation interface of the software development tool;

supplying the ACSDS to the suggestion presentation interface of the software development tool or withholding the ACSDS from the suggestion presentation interface of the software development tool and from any other presentation to any other software developer, in response to a result of the comparing;

presenting the ACSDS within the software development tool; and adopting the ACSDS when the first software developer applies the ACSDS to modify the source code using the software development tool.

17. The computer-readable storage medium of claim 16, wherein the suggestion filtering method further comprises displaying a source code context in which the ACSDS was previously created or previously adopted or both.

18. The computer-readable storage medium of claim 16, wherein the ACSDS was created based on source code edits made by a set of one or more software developers, and wherein the suggestion filtering method supplies the ACSDS to the suggestion presentation interface of the software development tool while the suggestion presentation interface of the software development tool is displayed to another software developer who is not in the set of one or more software developers.

19. The computer-readable storage medium of claim 16, wherein the criterion for supplying the ACSDS to the suggestion presentation interface of the software development tool is not user-defined.

20. The computer-readable storage medium of claim 16, wherein the suggestion filtering method further comprises:

ascertaining a suggestion adoption level which indicates an extent to which the ACSDS has been adopted after being presented within the software development tool; and adjusting the criterion for supplying the ACSDS to the suggestion presentation interface of the software development tool based at least in part on the suggestion adoption level.

* * * * *